(12) United States Patent
Fogle

(10) Patent No.: US 11,089,759 B2
(45) Date of Patent: Aug. 17, 2021

(54) PET LITTER BOX AND CLEANING SYSTEM

(71) Applicant: Eric Warren Fogle, Forestville, MD (US)

(72) Inventor: Eric Warren Fogle, Forestville, MD (US)

( * ) Notice: Subject to any disclaimer, the term of this patent is extended or adjusted under 35 U.S.C. 154(b) by 506 days.

(21) Appl. No.: 15/159,147

(22) Filed: May 19, 2016

(65) Prior Publication Data
US 2016/0286752 A1 Oct. 6, 2016

Related U.S. Application Data

(63) Continuation-in-part of application No. 15/016,460, filed on Feb. 5, 2016, now Pat. No. 10,849,310, which is a continuation-in-part of application No. 14/590,352, filed on Jan. 6, 2015, now Pat. No. 10,849,309.

(60) Provisional application No. 61/997,168, filed on May 23, 2014.

(51) Int. Cl.
*A01K 1/01* (2006.01)
*B25G 1/04* (2006.01)

(52) U.S. Cl.
CPC ............ *A01K 1/0114* (2013.01); *A01K 1/011* (2013.01); *B25G 1/04* (2013.01)

(58) Field of Classification Search
CPC .... A01K 1/0114; A01K 1/011; A01K 1/0107; A01K 1/0125; A01K 23/005; A01K 1/01; A01K 1/0132; A01K 1/0157; A01K 1/015
USPC ................ 119/166, 165, 161, 168, 169, 28.5
See application file for complete search history.

(56) References Cited

U.S. PATENT DOCUMENTS 3,851,763 A * 12/1974 Ball .......................... A01B 1/20
209/419
4,646,684 A * 3/1987 Embry ................. A01K 1/0107
119/167

(Continued)

FOREIGN PATENT DOCUMENTS

DE 202013008215 U1 * 10/2013 ........... A01K 1/0107

OTHER PUBLICATIONS

Advertisement: http://www_amazon.com. Cats Rule Stand Up and Scoop Telescoping Litter Scoop by Cats Rule, May 17, 2016, 6 pages.

(Continued)

*Primary Examiner* — Peter M Poon
*Assistant Examiner* — Jeffrey R Larsen
(74) *Attorney, Agent, or Firm* — Breiner & Breiner, L.L.C.

(57) ABSTRACT

Pet litter box cleaning system including a base structure, sieve member, and, optionally, trash receptacle is provided. The base structure includes a bottom wall and side wall(s) extending upward from the bottom wall except in one portion to leave an open side for receiving the sieve member therethrough. In a first embodiment, the sieve member includes a back wall for extending across the open side, a sifter and handle. In a second embodiment, a door serves to close the open side and the sieve member does not include a back wall. The trash receptacle may extend from an upraised wall of the base structure. In use, the sieve member is inserted in the base structure to clean litter of waste by lifting the sieve member by the handle whereby clean litter passes through the sifter and waste collects on the sifter which then is disposed of into a trash receptacle.

25 Claims, 16 Drawing Sheets

(56) References Cited

U.S. PATENT DOCUMENTS

| | | | | |
|---|---|---|---|---|
| 5,921,596 A * | 7/1999 | Sheriff | ............... | B07B 1/02 209/418 |
| 6,295,948 B1 * | 10/2001 | Bowron | ............... | A01K 1/0107 119/165 |
| 6,588,369 B2 * | 7/2003 | Carlisi | ............... | A01K 1/0107 119/166 |
| 6,820,628 B2 * | 11/2004 | Larson | ............... | A01B 1/02 135/66 |
| 7,481,182 B2 * | 1/2009 | Simpson | ............... | A01K 1/0125 119/168 |
| 7,628,118 B1 * | 12/2009 | Nottingham | ............... | A01K 1/0114 119/166 |
| 8,336,497 B2 * | 12/2012 | van Zuilekom | ............... | A01K 1/0107 119/165 |
| 8,851,014 B2 * | 10/2014 | Hecht | ............... | A01K 1/0114 119/166 |
| 2004/0244708 A1 * | 12/2004 | Neil | ............... | A01K 1/0125 119/168 |
| 2007/0084413 A1 | 4/2007 | Oertel et al. | | |
| 2007/0163508 A1 | 7/2007 | Gloor | | |
| 2008/0164704 A1 | 7/2008 | Boskett et al. | | |
| 2009/0199778 A1 | 8/2009 | Kratzer et al. | | |
| 2011/0100301 A1 * | 5/2011 | Trussardi | ............... | A01K 1/0107 119/169 |
| 2012/0318203 A1 | 12/2012 | Andrade et al. | | |
| 2013/0133585 A1 | 5/2013 | Hecht | | |
| 2013/0319340 A1 | 12/2013 | Bellini et al. | | |

OTHER PUBLICATIONS

Advertisement: http://www.etsy.com, StandNScoop Litter Box, Cat Scoop, May 17, 2016, 7 pages.

* cited by examiner

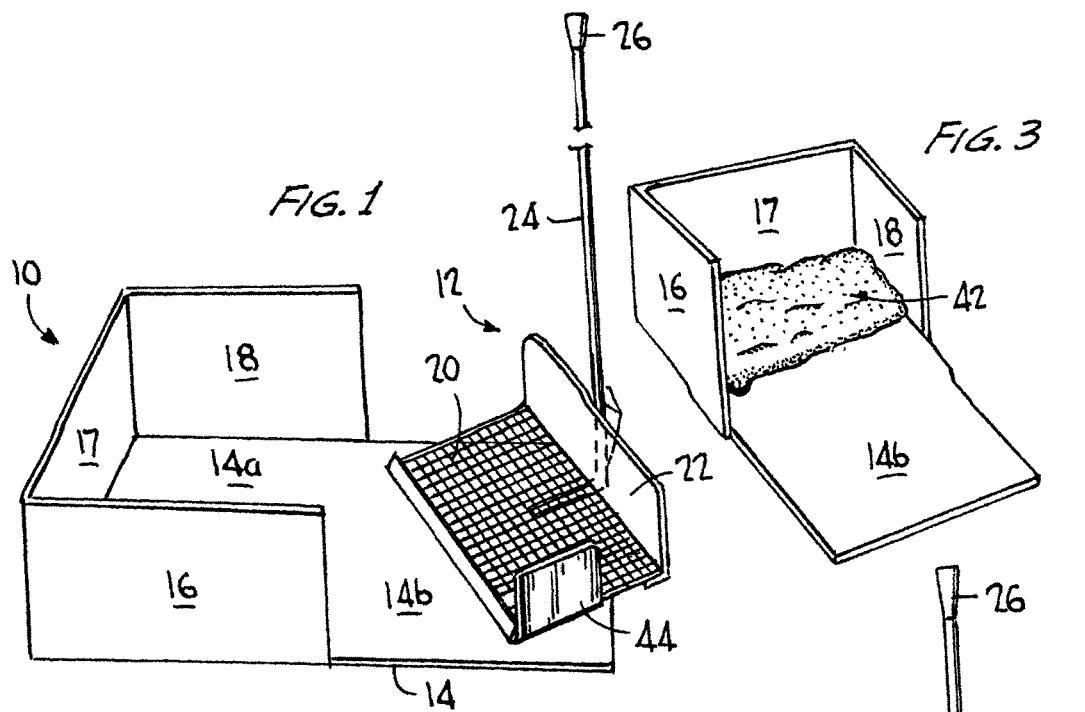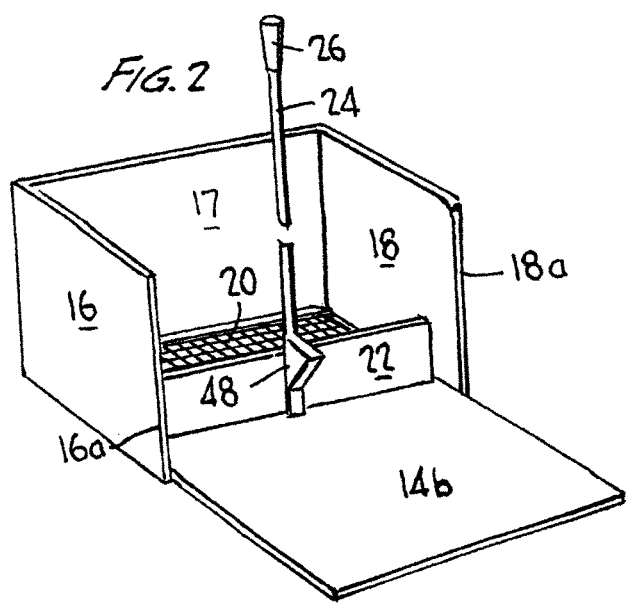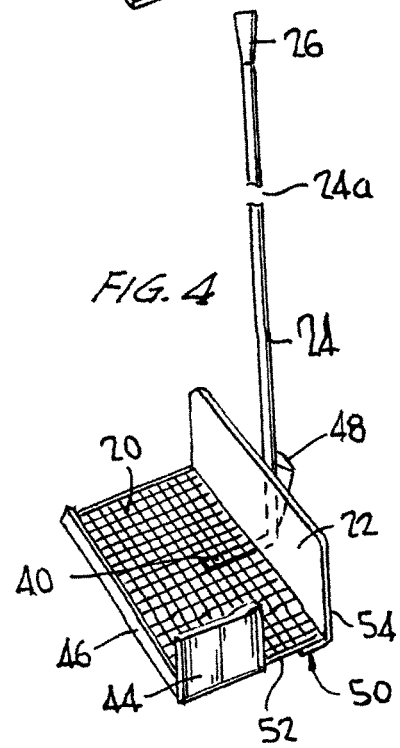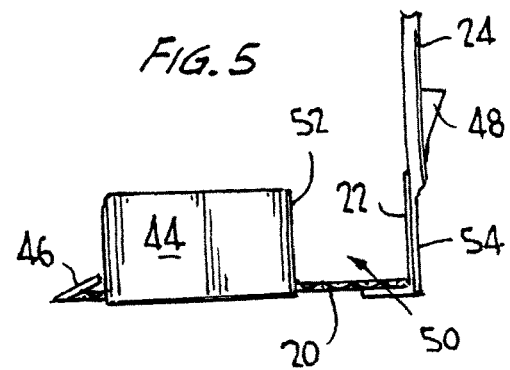

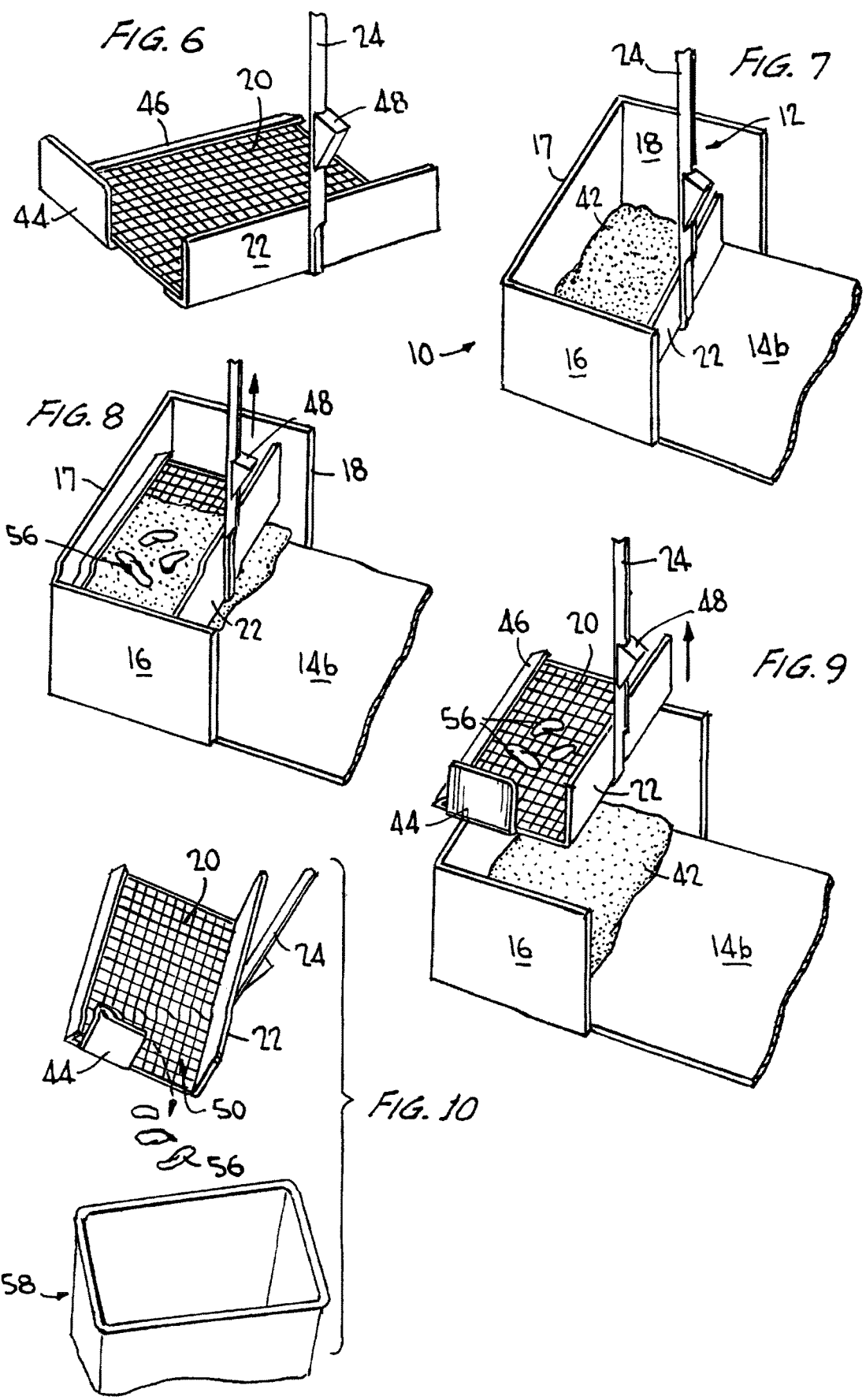

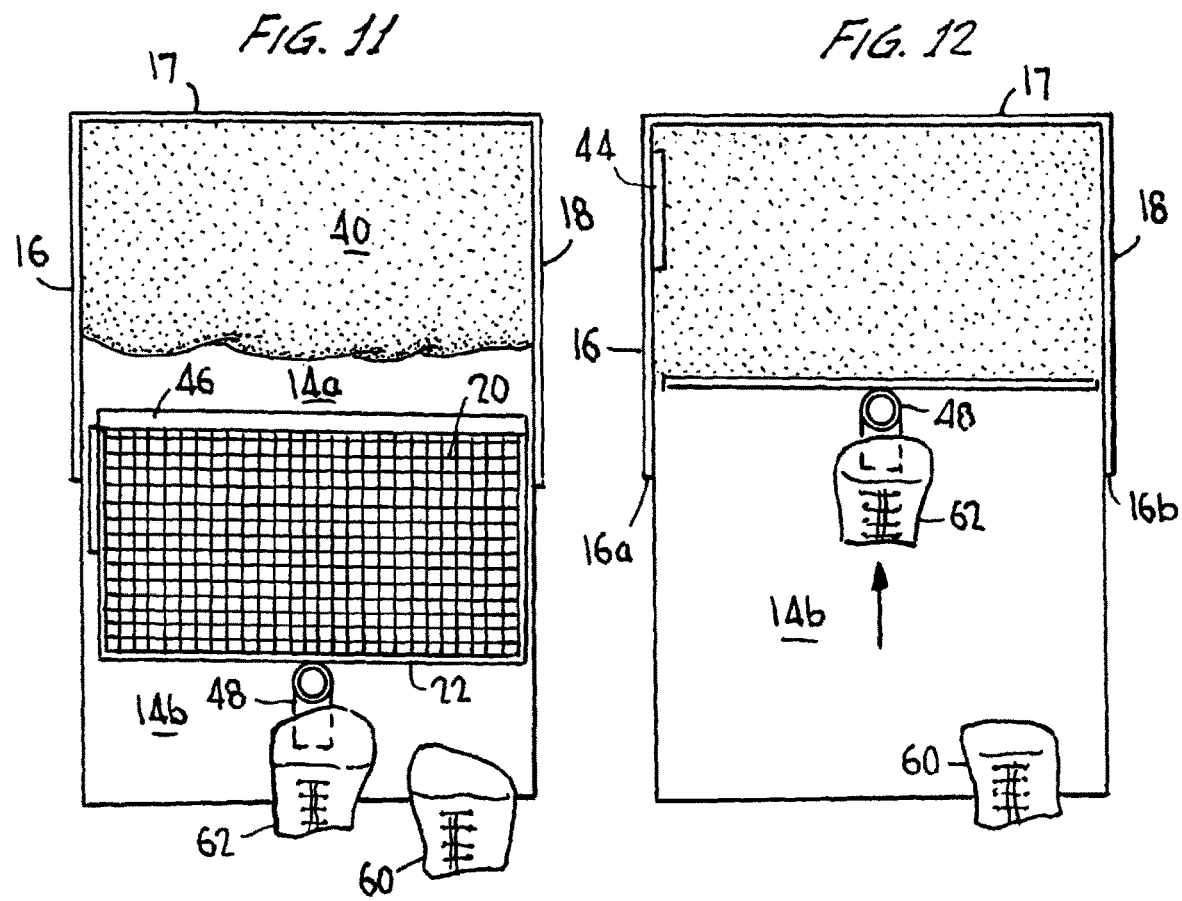
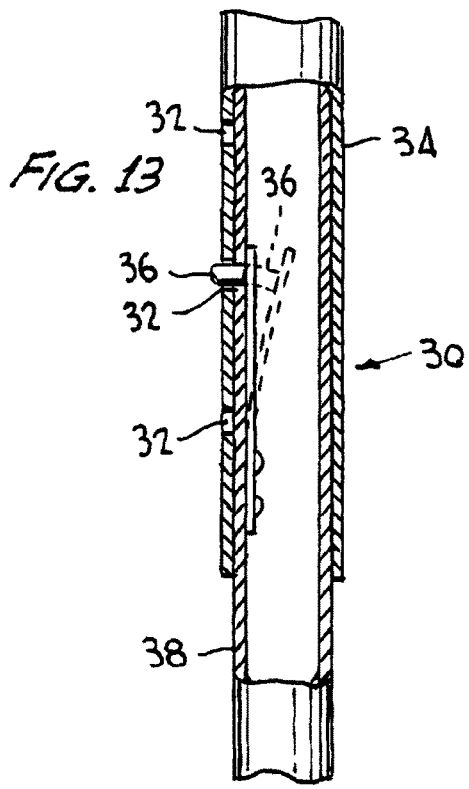

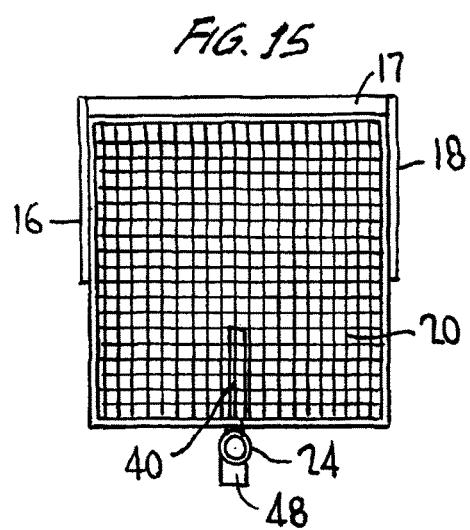
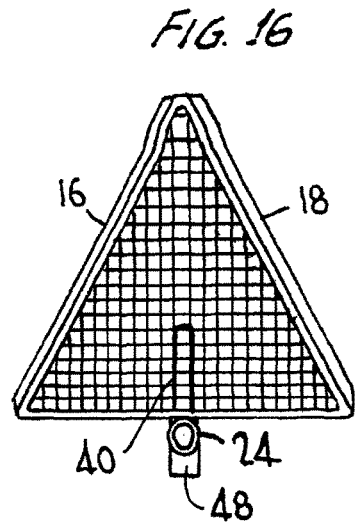
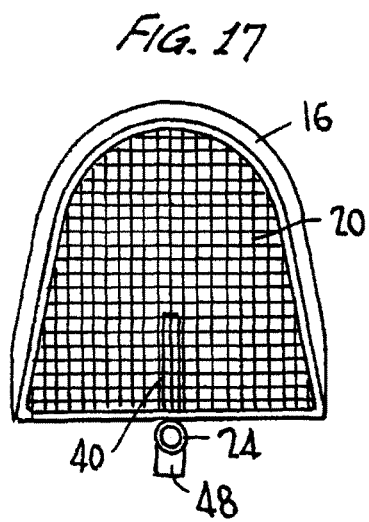
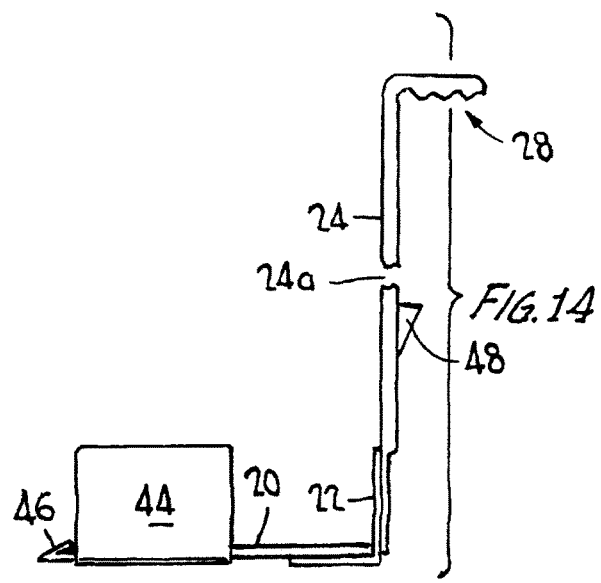
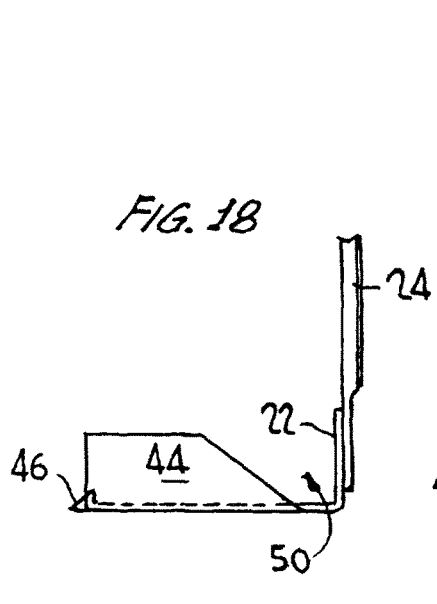
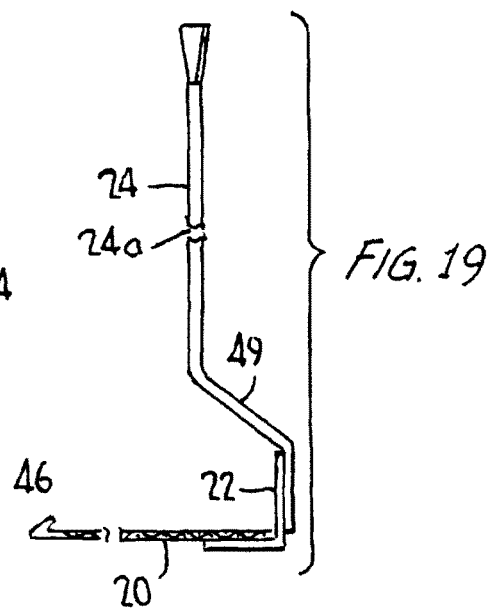

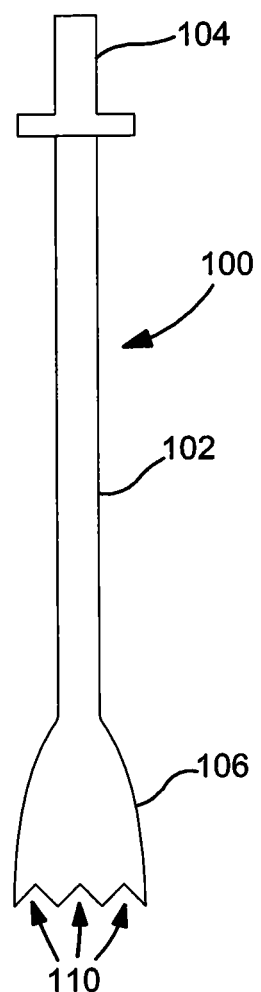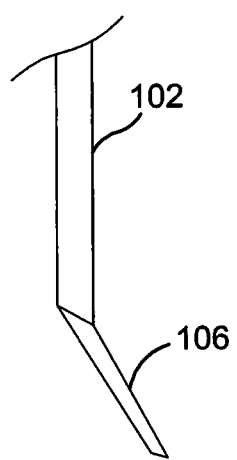
FIG. 30  FIG. 31

PET LITTER BOX AND CLEANING SYSTEM

RELATED APPLICATIONS

The present application has common subject matter with and is a continuation-in-part application to U.S. Ser. No. 15/016,460 filed Feb. 5, 2016 entitled "Pet Litter Box and Cleaning System" and is a continuation-in-part application of U.S. Ser. No. 14/590,352 filed Jan. 6, 2015 entitled "Combined Pet Litter Box And Cleaning Sieve", which claims benefit of U.S. Provisional Application Ser. No. 61/997,168 filed May 23, 2014 entitled "SAVVY SIEVE", which are each incorporated herein by reference.

FIELD OF INVENTION

A pet litter box combined with a sieve for cleaning animal waste from the litter box is described. The litter box and sieve are arranged to be animal friendly to encourage use of the box, while minimalizing physical action necessary for cleaning waste from the litter box. In another embodiment, the pet litter box is further combined with a trash receptacle to provide for ready and clean disposal of waste from the sieve.

BACKGROUND OF THE INVENTION

Pet litter boxes are maintained in households for small pets (primarily cats, but also small dogs, rabbits, ferrets, or other pets of a size that instinctively or through training use a litter box) to allow for urination and excretion by a pet as needed by the pet without the necessity of going outside. Conventional litter boxes are open-top rectangular pans, i.e., containers with four side walls and a bottom wall which are filled with a litter material to absorb urine and cover the feces excreted (which for convenience will be referred to generally herein as "waste" or "waste product"). Numerous types of litter are sold commercially, including clay-based litter, clumping litter made of bentonite or diatomaceous earth or silica-based, biodegradable litter (pinewood pellets, recycled newspaper, barley, dried orange peels, etc.), and granular silicon dioxide. Conventional litter is sold in clumping and non-clumping styles. Due to the odors and visual nature of the waste product in the litter box, litter boxes are generally maintained on the floor in an out-of-the-way location. A hand scoop is used to remove waste from a conventional litter box. When not in use, the scoop is usually placed near the box on a piece of paper or the like (to avoid dirtying the surface) until next use. The location and use of a hand scoop (even if the hand scoop has an extended handle) can require uncomfortable physical exertion by a person when it is necessary to clean the litter box of waste, especially for a person of an older age or if disabled or of lesser strength. For most single cat households, removal of waste from a litter box usually is preferably done at least twice a day. Physical exertion that can create difficulty or discomfort is due to bending over the box, kneeling to avoid bending, and raking arm motions to move the litter to sift through the litter to locate and lift out the waste for placement in the trash. For an elderly or infirm person, this can be followed by a struggle to stand erect once finished cleaning the litter box. If the litter box is hooded, even more physical exertion is required to clean waste from the litter box. Following this action, the waste must then be carried to a trash receptacle for disposal. Due to exertion or difficulty in movement or size of the waste or litter, this step risks dropping some of the scooped waste or litter onto the floor.

While mechanized self-cleaning litter boxes are commercially available for automatic removal of waste from the litter, such are expensive, require electric or battery power (added expense), and/or water hook-up and/or purchase of disposable bags and are subject to not working as well as desired or of breaking down. Generally, over time, self-cleaning litter boxes will also require someone to kneel down or bend over to remove hidden waste that accumulates because such boxes do not result in 100% removal upon each automatic cleaning. Additionally, such mechanized litter boxes are generally covered and, thus, not liked by all pets and become a waste of money.

Therefore, a need exists for a litter box which can be readily cleaned with minimal physical motion or exertion, especially which does not require a person to bend over or kneel, while remaining animal friendly and inexpensive. The present invention provides for these features.

SUMMARY OF INVENTION

The invention is directed to an animal or pet litter box cleaning system including a litter box in combination with a cleaning sieve and, optionally, a trash receptacle. In use, no bending or kneeling is required by a person to clean waste from the litter box using the sieve. Minimal manual motion and exertion is required. Risk of waste or litter falling from the sieve is avoided.

The cleaning system includes a litter box as a base structure, and a sieve member. A trash receptacle can optionally be combined with the base structure. The sieve member in a non-cleaning mode is free-standing and may be inserted in the litter box until such time that the box requires removal of waste therefrom. The sieve then lifts the waste from the litter for placement into a trash receptacle.

In a first embodiment, the litter box as the base structure includes a bottom wall which is geometrically shaped and has one or more side walls extending upward from the bottom wall in an arrangement that leaves one side open, i.e., no wall extending upward from the bottom wall is present. The side wall can be a one piece curved wall or a plurality of flat adjoined walls so as to provide with the bottom wall, for example, a semi-circle, U-shape, square, triangle, rectangle, or other geometric shape with at least one side area remaining open to allow for insertion of the sieve member into the base structure as described below.

The bottom wall of the base structure of the first embodiment includes a second portion extending outward from the open side of the base structure. This second portion is flat and is preferably a continuous extending piece of the bottom wall having the upstanding side wall(s). The extension forming the second portion of the bottom wall does not include side walls and is sized to allow a person to step at least partially on the extension at the time the litter box is to be cleaned as further described below.

The sieve member for use in the first embodiment includes a sifting portion, such as a screen or grid portion, having an arrangement of widthwise and/or lengthwise crossbars, having a geometrical shape which allows for insertion of the sifting portion through the open wall of the base structure where the sifting portion will sit atop the bottom wall and inside the upstanding wall(s) of the base structure. The sifting portion is preferably complementary in shape to the shape of the bottom wall in the base structure. The sifting portion along an end thereof, which is present upon insertion in the base structure along the end of the bottom wall which does not include an upstanding wall (i.e., the open side), includes an upstanding wall which is constructed and arranged to serve as a back wall to substantially close the length of the open side of the base structure. The wall of the sieve member, however, has a height sufficiently low that a pet can step or jump over the wall to enter the base structure for use. The other side wall or walls of the base structure are preferably higher to lessen the scattering of litter outside the base structure by a pet scratching in or moving around the litter.

Attached to or extending upward from the back wall of the sieve member is a handle member for manually moving the sifting portion for placement into and out of the base structure and for removal of waste from the base structure. The handle can be of a pre-determined length or height, or can include a mechanism to allow adjustment of the handle height to reduce the handle height when not in use or to customize the height of the handle to a user's height. The handle can include a grip portion, which can be upright, a curved or angled extension at the top free end of the handle such as in the manner of a cane handle, or the like to provide a comfortable and secure gripping surface. Further, the handle member can have a curved or angled body section to allow for a shift in the center of gravity to increase leverage and/or serve as a foot rest for assisting in placement of the sieve member in the base structure.

Preferably, one side end of the sifting portion may include a wall which only partially extends the length of the side end so as to leave an open space between the side wall and the back wall. This structure acts as a funnel when the sieve member is turned sideways to empty waste collected by the screen from the sieve member.

In use, a person by means of the handle member, inserts the sifting portion of the sieve member into the base structure and allows it to sit atop the bottom wall. The back wall of the sieve member acts as a wall in the open wall section of the base structure. Litter is poured on top and over the sifting portion of the sieve member to a desired depth. A pet can enter the base structure over the back wall of the sieve member and use the litter in a conventional manner. When waste is to be removed from the base structure, a person simply takes hold of the grip of the handle and lifts the sieve member out of the open top and open wall side of the base structure. (If the sifting portion does not extend the entire length of the bottom wall, it may be necessary to push the sieve member forward, e.g., by foot, to make sure all waste is caught up by the sifting portion. Alternately, a cleaning implement may be used to push any waste into the area of the sifting portion as described further below.) As the sieve member is lifted, the clean litter passes through the openings in the sifting portion back into the base structure atop the bottom wall. Waste remains on top of the sifting portion. As the sieve member is lifted, the member will get lighter in weight due to the litter sifting through the crossbars of the sifting portion and back into the base structure. The sieve member is then tilted sideways with the back wall, and the side wall when present, of the sieve member serving to direct the waste into a trash receptacle.

In a second embodiment, the litter box as the base structure includes a bottom wall which is geometrically shaped and has one or more side walls extending upward from the bottom wall in an arrangement that leaves one side open, i.e., no wall extending upward from the bottom wall is present. The side wall can be a one piece curved wall or a plurality of flat adjoined walls so as to provide with the bottom wall, for example, a semi-circle, U-shape, square, triangle, rectangle or other geometric shape with at least one side area remaining open.

The open side of the base structure of the second embodiment will be closed by a door. Preferably, the bottom wall extends out beyond the door to provide a surface which can receive loose litter that may fall out when the door is opened or the pet may track out, and/or which can be stepped on to stabilize the base structure when being cleaned using the sieve member as described further below. The door will have a height low enough for a pet to enter the litter box but sufficiently high to retain litter within the base structure when the door is closed. The door is preferably connected at one end to an adjoining wall by a hinge structure. The hinge structure may be a separate element connecting the door to the adjoining wall or the hinge structure may be integral with the door and adjoining wall, such as a living hinge, when the door and adjoining wall are an integral molded structure with a living hinge therebetween. The other end of the door and adjoining wall are provided with a closure mechanism, preferably a magnetic closure system. The closure mechanism for ease of use is preferably openable and closable with minimal force. Accordingly, while closure mechanisms other than a magnetic closure system can be used, a magnetic closure system is preferred for the natural attraction for closing, yet minimal force required to open. This maintains the ability to open and close the door without bending and/or kneeling which achieves a desired advantage of the litter box cleaning system. The magnetic closure system, for example, includes a metal strip or piece and a magnet of a strength to attract and retain the metal strip or piece thereon when brought together. The magnet may be placed on or in an end of the adjoining wall and a metal strip or piece attached to the door in a manner to abut the magnet when in a closed position to retain the door in a closed position. Alternatively, the metal strip or piece may be located on an edge of the door and the magnet on an inside surface of the adjoining wall or vice versa to hold the door closed when the metal and magnet are aligned.

The sieve member for use in the second embodiment includes a sifting portion, such as a screen or grid portion, having a suitable shape and size to allow for insertion of the sifting portion in the litter box for sifting the litter to clean out waste matter therefrom. Unlike the first embodiment, the sieve member of the second embodiment does not require an upstanding back wall. Further, since the sieve member is not required to be of a width to extend across the open side of the base structure, the sifting portion can be smaller. A handle member extends upward from the sifting portion and can be of a structure such as described above in relation to the first embodiment. The handle member is of a height to allow for manual movement of the sifting portion for removal of waste from the base structure without a user having to bend or kneel. The sifting portion, as described, can be smaller in size in the second embodiment and can be stored with the handle member in an upright position and the sifting portion flat on the floor or on the bottom wall of the base structure.

In use with the base structure of the second embodiment, the sieve member is used to open the door of the base structure by simply making a tap or push on the inside surface of the door to dislodge the metal catch from the magnet and allow the door to swing open along the hinge. While the door is open, the sieve member can pass through the open side to be inserted under the litter and sift the litter to remove waste from the litter. Collected waste will then be disposed of in a trash receptacle. The trash receptacle may be independent of the base structure or may be connected thereto as described below. To close the door, the sieve member is used to simply re-position the hinged door so as to allow the metal and magnet to catch and hold the door in a closed position.

In the pet litter box cleaning system of the invention, rather than using a separate trash receptacle present at a distance from the litter box, a trash receptacle can be structured to extend from one side of the base structure. Preferably, the trash receptacle and base structure share at least a portion of a common upraised wall and are one piece. Alternatively, one wall of the trash receptacle can be affixed to one of the upraised walls of the base structure by a suitable joining member, e.g., U-shaped clip(s), snap(s), Velcro strips, overhanging lip, or other suitable material and structure. The adjoined base structure and trash receptacle allows a user to lift the sieve member and tip it directly into the trash receptacle without need to carry it any distance to an independent trash receptacle. This avoids the possibility of dropping any waste or litter from the sieve member, especially in the event that the sieve member is full. The trash receptacle adjoining the base structure will have a lid which preferably is structured to be lifted for opening by the sieve member so as to avoid a user having to touch the trash receptacle or bend over to reach the trash receptacle. The trash receptacle can have a re-usable or disposable liner for easy and sanitary emptying of the trash receptacle.

The pet litter box and cleaning system, preferably, also includes a cleaning implement for scraping any waste which may adhere to the sifting portion, or to move over atop the sifting portion any waste present in the litter in the base structure to insure it is picked up and held by the sieve member during cleaning of the litter. Due to moisture present in some waste, the waste and/or litter may adhere to the crossbars of the sifting portion so having a cleaning implement readily available is advantageous. The cleaning implement has a handle and a scraper head. The handle is preferably of an extended length to avoid the need for bending during use of the implement. The scraper head is angled in relation to the handle so as again to avoid the need to bend over during use of the scraper head. The scraper preferably has at least a plurality of teeth or tines, which can be of different configurations but essentially are shaped so as to extend between the crossbars of the sifting portion. An efficient compatibility between the scraper head and the sifting portion is when the crossbars extend in a parallel widthwise direction with no or a minimal number of lengthwise crossbars so that it is easier to move the teeth of the scraper head over and between the crossbars to clean the sifting portion. In an alternative embodiment, the scraper head can have two ends, one end with a plurality of teeth and one end with a straight edge to move waste over on top of the sifting portion or to scrape across the top of the sifting member to clean it if waste and or litter adhere thereto. The litter box system preferably has a holder member, e.g. clip or hook, made as an integral part of or attached to and extending from a wall of the base structure or trash receptacle wherein the holder member is constructed and arranged to receive and hold the cleaning implement during non-use.

Following emptying of the contents of the sieve member into the trash receptacle, the lid is closed. With the first embodiment, the sifting portion of the sieve member is then reinserted into the base structure in a manner so that the litter is again atop the sifting portion of the sieve member. The user will step on the extension to the bottom wall during this process so that the base structure does not move when the sieve member is inserted into the base structure by pushing the sifting portion under the litter to again sit on the bottom wall beneath the litter and align the back wall of the sieve member along the edge or within the side walls of the base structure. To further ease insertion of the sifting portion under the litter during reinsertion of the sieve member into the base structure, the forward or leading end of the sifting portion preferably has an inclined lip structure. Further, a foot rest or pedal can be positioned on the back of the handle or back wall of the sieve member, or the handle member can include an angled or curved portion therein, so the person can use foot pressure thereupon to push the sifting portion into place. In the second embodiment, the sieve member can be stored in any convenient place in an upright manner for ready access when next needed.

Accordingly, the base structure can be cleaned of waste from the litter and the waste disposed of in a trash receptacle without the need to bend or kneel through a single upward lifting motion wherein the weight gets lighter as the sieve member is lifted and emptying is a mere tipping of the sieve member into a trash receptacle. Insertion of the sieve member to clean the litter or reinsertion of the sieve member in relation to storage in the first embodiment takes minimal effort to shove the sieve member back into the base structure beneath the litter. This latter action can be eased through the use of body weight on the second portion of the bottom wall of the base structure in the first embodiment, an included lip on the forward end of the sifting portion to commence insertion, and the ability to use foot force or power to push the sifting portion into the base structure.

The base structure is preferably made of one piece. The base structure can be made of plastic, cardboard, metal, wood, or other rigid material, or combination thereof. Alternatively, the base structure can be made of multiple components joined or interlocked together, such as by tape, inter-fitting edges, welding, or the like.

The sieve member is also preferably made of one piece. Alternatively, the sieve member can be made of multiple components joined or interlocked together, such as by tape, inter-fitting edges, welding, or the like. The sieve member can also be made of plastic, metal, or other rigid material, or combination thereof. The material selected must have sufficient rigidity to allow for insertion and removal to meet their intended functions.

The trash receptacle can be one piece with the base structure or a separate and adjoining structure affixed to an upraised wall of the base structure by suitable joining members, e.g., clips, snaps, Velcro (mating hook and loop structures) and the like. The lid of the trash receptacle can be adjoined to the receptacle portion by one or more hinge or pivot members, or a living hinge structure when the receptacle is made of plastic. The trash receptacle can be made of plastic, cardboard, metal, wood, or other material so long as the top opening can be made rigid to allow for hands-free emptying of the sieve member into the trash receptacle, e.g., a rigid wire in the shape of a circle, square or the like, with a U-shaped clip(s) or other joinder structure for attachment to an upraised wall of the litter box which then has a bag hanging therefrom by suitable means to receive the waste. The bag can then be removed for disposal when desired.

BRIEF DESCRIPTION OF THE DRAWINGS

FIG. 1 is a perspective view of the base structure and the sieve member prior to insertion of the sieve member into the base structure.

FIG. 2 is a perspective view of the sieve member inserted into the base structure.

FIG. 3 is a perspective view of the base structure having litter therein.

FIG. 4 is a perspective view of the sieve member.

FIG. 5 is a first side view of the bottom half of the sieve member.

FIG. 6 is a back perspective view of the bottom half of the sieve member.

FIG. 7 is a perspective view of the sieve member inserted in the base structure with litter in the base structure on top of the screen portion of the sieve member.

FIGS. 8, 9 and 10 illustrate the sequence for using the sieve member to remove waste from the litter in the base structure. FIG. 8 illustrates the upward lifting by gripping of the handle portion (grip and person not shown) allowing sifting out of the litter during the raising action. FIG. 9 shows the retention of waste on the screen of the sieve member once all the litter has been sifted through the screen. FIG. 10 illustrates funneling the waste through a side opening in the sieve member into a trash receptacle.

FIGS. 11 and 12 illustrate reinsertion of the sieve member under litter in the base structure. In particular, FIG. 11 shows a user's foot on a foot rest or pedal on the rear of the handle to push forward the screen portion of the sieve member under the litter and shows the user's other foot on the extension from the bottom wall to hold the base structure in place. FIG. 12 shows the screen member inserted under the litter ready for further use.

FIG. 13 illustrates a cut-away view of a portion of a telescoping handle suitable for use in the sieve member to allow for adjustment in height of the handle.

FIG. 14 is a side view of a sieve member with a cane-shaped handle.

FIGS. 15, 16 and 17 show examples of alternate geometric shapes for the base structure and the sifting portion of the sieve member. FIG. 15 shows a square. FIG. 16 shows a triangular shape. FIG. 17 shows a curved wall shape that can be modified to be a semi-circle, U-shape or the like.

FIG. 18 is a partial side view of the sieve member showing an extended and sloped side wall for an end of the screen portion which provides a funnel in combination with the back wall of the sieve member.

FIG. 19 shows an alternate handle member including an angled portion structured to shift the center of gravity and/or serve as a foot rest upon reinsertion of the sieve member in the base structure.

FIG. 30 is a front planar view of one embodiment of a cleaning implement.

FIG. 31 is a partial side view of the cleaning implement 2 of FIG. 30.

DETAILED DESCRIPTION OF THE INVENTION

Figure 20:
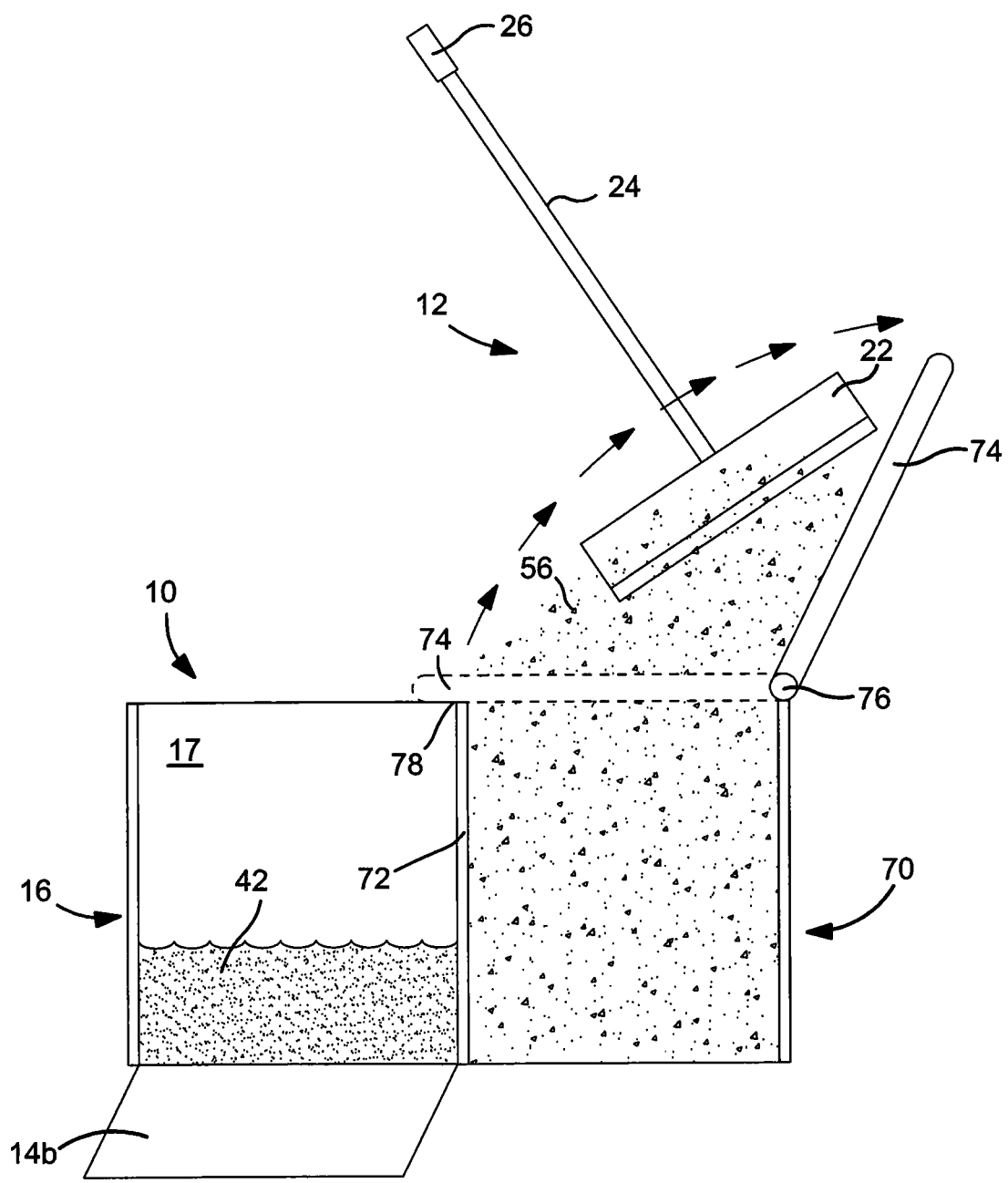
FIG. 20 is a front view of one embodiment of the base structure with a trash receptacle extending from one upraised wall of the base structure wherein the base structure and the trash receptacle have a common upraised wall.

The invention is directed to a combined litter box and sieve member which is pet friendly in use by not being an enclosed structure and provides for cleaning waste from the litter and disposal of the waste without the need for bending, kneeling or the like through minimal manual motions and lightweight lifting.

The combined litter box and sieve member includes a base structure and a sieve member. The base structure, and accordingly, the sieve member, can be of various geometric configurations to allow for variation in placement of the litter box within a household. Litter boxes are generally used for cats, although other household pets may be trained to use a litter box, such as small dogs, rabbits, ferrets, etc. Conventionally, litter boxes are rectangular to provide a larger space for the animal to move around. Cats generally scratch and/or move around the litter prior to and after use. The invention is described and illustrated herein for ease of discussion as a rectangular structure with the understanding that alternative shapes may be utilized, such as a square, triangular, semi-circular, U-shaped, circular, etc. as also described and shown herein.

As shown in FIG. 1, the base structure 10 includes a first portion 14a and a second portion 14b. First portion 14a is a bottom wall which defines an area which will, in use, contain the litter and receive the sieve member 12. The first portion 14a of the bottom wall will have one or more side walls extending upward from the free ends of the bottom wall leaving one side open through which the sieve member can be inserted. As shown in FIG. 1, the bottom wall 14a has three upraised walls 16, 17 and 18 and an open space extending between free side ends 16a and 18a of opposite walls 16 and 18. If the base structure were in the alternative shape of a semi-circle or the like, one curved wall could be used, such as in FIG. 17. If the alternative shape was triangular, two upraised flat walls would be used with the third side being open, such as shown in FIG. 16.

As shown in FIGS. 1 and 2, the sieve member 12 includes a sifting portion illustrated as a screen or grid portion 20, a back wall 22 suitably attached to the back end of screen portion 20, and a handle 24. Handle 24 includes a grip 26. The grip can be upright as shown in FIGS. 1-4 or can be of alternative structures, such as a cane shape 28 as shown in FIG. 14. Further, the handle 24 can be of a single predetermined height (FIGS. 1-4 being shown with a broken section 24a to indicate that the selected height of the handle can vary) or can be a telescoping handle 30 as shown in FIG. 13. A suitable telescoping handle can have a plurality of holes 32 on an outer telescoping portion 34 for receiving a projection 36 on an inside telescoping portion 38 to allow for adjustment in height and a locking in place of the desired height. The adjustment in height can be used to minimize the height of the handle when not in use or to customize the height to a particular user. The handle can alternately have an angled or curved section, such as angled section 49 as shown in FIG. 19. This angled or curved section can be structured so as to shift the center of gravity to allow for easier lifting of the sieve member. The angled section can also serve as a foot rest as further described below.

The sifting or screen portion will have an opening or mesh size which can be varied so long as the openings provided allow litter particles to pass therethrough while essentially retaining waste or clumps of litter on the top side of the sifting portion when it is used to sift the litter to remove waste. The sifting portion can be made of various materials (e.g., plastic or metal or combination of materials) and depending on the rigidity (i.e., strength) selected for the sifting portion, a brace 40 may be included to provide additional rigidity (strength) to the sifting portion. The handle 24 may be attached to the back wall 22 and/or the brace 40.

The sifting portion of the sieve member is sized to fit through the open side of the base structure as shown in FIG. 2. As shown in FIG. 3, the area within upraised side walls 16, 17, and 18 and on top of the first portion 14a of the bottom wall is filled with litter 42 as commercially available. In use, the sieve member 12 will be inserted in the base structure 10, with the litter 42 on top of the sifting portion of the sieve member as shown in FIG. 7.

Other features which are preferably present in the sieve member to facilitate ease of use of the sieve member are side wall 44, inclined lip 46, and foot rest or pedal 48 or angled or curved portion 49. The side wall 44 extends a portion of the length of one end of the sifting portion leaving an opening 50 between one end 52 of wall 44 and one end 54 of back wall 22. This provides a funnel structure for emptying waste collected by and on the sifting portion as further described below. Optionally, a wall in the manner of wall 44 can be present on each side end of the sifting portion to allow for ease of disposal in either direction. Inclined lip 46 is along the front or leading edge of the sifting portion and facilitates insertion of the sifting portion of sieve member 12 under the litter contained in base structure 10 as also further described below. Foot rest 48, and angled/curved portion 49, are another means to facilitate reinsertion of the sifting portion of the sieve member under litter 42 as further described below. Lip 46 can be provided in one piece as part of the sifting portion or can be a separate piece attached to the leading edge of the sifting portion.

The use of the combined base structure and sieve member will now be described. The sieve member 12 is inserted in base structure 10 with the sifting portion positioned on top of first portion 14a of bottom wall 14 with back wall 22 equal with or inward of side edges 16a and 18a to at least substantially contain in use litter within the confines of walls 16, 17, 18 and 22 as shown in FIG. 2. Litter 42 is poured over the sifting portion and bottom wall portion 14a into the area bounded by walls 16, 17, 18 and 22 as shown in FIG. 7. A pet will use the litter in base structure 10 to urinate and/or defecate leaving waste product in the form of litter-absorbed liquid or solids. The litter is periodically cleaned of these materials to remove odor, unsightly waste and to make the litter box conducive to re-use. To clean the litter and remove the waste product, a user holds the handle 24 at grip 26 or otherwise as comfortable and lifts the sieve member 12 thereby raising screen 20. The raising action allows clean litter to sift through the openings in screen 20 back into the base structure as shown in FIG. 8 with the waste product 56 being retained on top of screen 20 as shown in FIG. 9. The sieve member can then be tilted to the side, preferably including side wall 44, to direct the waste product 56 out one side of sieve member 12 into a trash receptacle 58 or other appropriate place for disposal. Wall 44 can be extended in length and sloped towards opening 50, as shown in FIG. 18, to enhance the funneling and collection of waste for removal through opening 50.

Following disposal of the collected waste, the sieve member is reinserted into the base structure 10 for continued use. For reinsertion with reference to FIGS. 11 and 12, the user's body weight through placement of a foot 60 on the second portion 14b of the bottom wall is used to maintain base structure 10 in place. The sieve member is then slid forward to insert the screen 20 under the litter 42. This is facilitated by inclined lip 46 (when preferably present) and foot rest 48 or angled/curved portion 49 in handle member 24. The inclined lip eases entry of screen 20 under litter 42. The user places a foot 62 on foot rest 48 or section 49 and thereby pushes sieve member 12 forward with screen 20 being inserted in base structure 10 under litter 42, see FIG. 12. The sieve member can either be pushed forward to essentially abut wall 17 and inward of the free edges of side walls 16 and 18 as shown in FIG. 12 to provide a smaller area for when have a smaller animal using the litter box, or the sieve member 12 does not have to be inserted fully forward or can be made shorter than area 14a while still aligning wall 22 with free side ends 16a and 18a of walls 16 and 18 to provide a larger area for the litter when have multiple animals or a larger animal using the litter box.

In the construction of base structure 10, the structure is preferably one piece and made of plastic. This provides for easiest maintenance and cleanliness. However, as would be known to one skilled in the art, the base structure can be constructed of multiple components suitably connected if desired. The same follows for sieve member 12. The screen, back wall and handle of sieve member 12 may be cast as one piece or multiple components as applicable. The dimension of the base structure and sieve member can vary depending on how big or small a structure is desired, and the shape or configuration selected for the overall device to have.

A preferred example of the invention in rectangular form has the following dimensions (it being understood that the dimensions are approximate and can be varied to accommodate manufacturing tolerances and the like):

(1) Sieve member 12
  (a) screen 20—14 inches×16 inches
    ¼ inch mesh
  (b) handle 24—40 inches (or adjustable within this range or a greater range)
  (c) side panel 44—4 inches×5 inches
  (d) rear panel 22—4 inches×16 inches
  (e) foot rest 48—3 inches×1 inch
  (f) front lip 46—1 inch×16 inches
(2) Base structure 10
  (a) bottom wall portion 14*a*—17 inches wide×15 inches deep
  (b) bottom wall portion 14*b*—17 inches wide×16 inches deep
  (c) side wall 17—17 inches wide×10 inches tall
  (d) side walls 16 and 18—15 inches wide×10 inches tall.

A second embodiment of the invention is shown in FIGS. 33-36. As in the first embodiment, a base structure and sieve member are provided. The base structure can be of various geometric configurations and include a bottom wall with at least one upraised wall with an open side as described above with respect to the first embodiment. Also as with the first embodiment, for ease of discussion, the second embodiment will be described as being rectangular which is a preferred configuration for pet litter boxes. The bottom wall can have an extension out through the open side or the base structure can be present on a platform which is sized to extend outward from at least the open side. The purpose of this extension is described below.

In the second embodiment, as shown in FIGS. 33-36, the base structure includes bottom wall 120 and upraised walls 16, 17 and 18. A door 122 is present in the open side. The door is constructed to be openable and closable with respect to the open side of the base structure. The door is of a height sufficient to retain litter within the base structure while allowing a pet to climb or jump over the door to enter the base structure and use the litter. The door is hinged on one end and has a closure mechanism on the other end which is readily openable and closable, preferably a magnetic closure system. The hinge structure 124 can be of a conventional structure. It can be a separate hinge affixed to the door and adjoining upraised wall or an integral hinge, such as a living hinge, when the upraised walls and doors are a one piece plastic structure.

Figure 33:
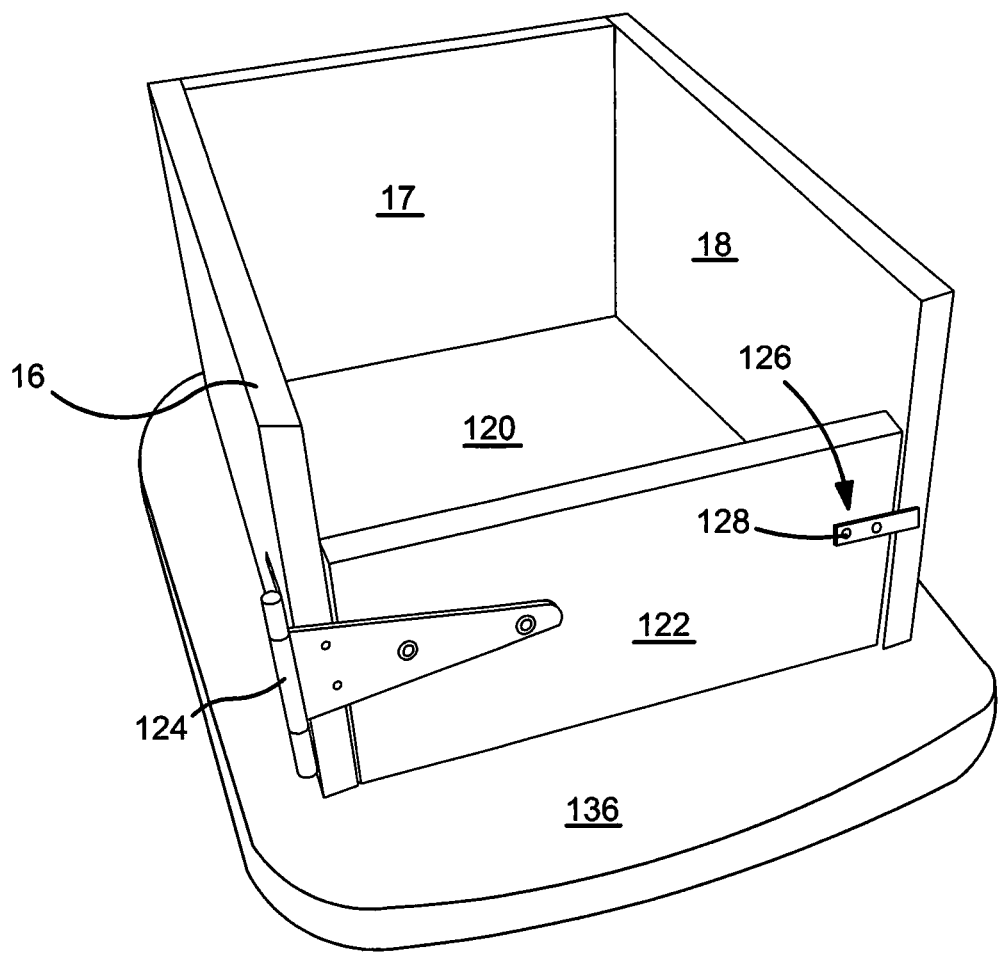
FIG. 33 is a front perspective view of the second embodiment of the base structure with the door in a closed position.
Figure 34:
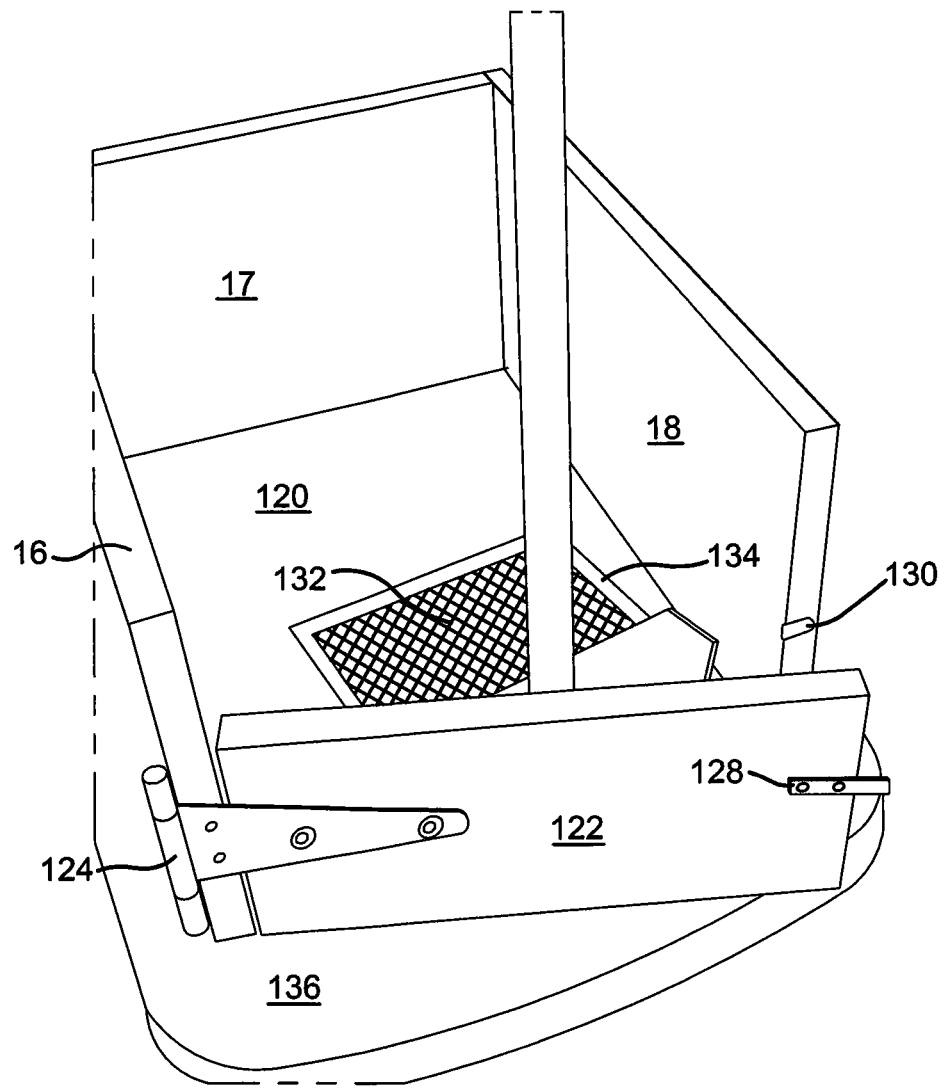
FIG. 34 is a partial front perspective view of the second embodiment of the base structure with the door in a partially open position due to the action of the sieve member against the inside surface of the door.
Figure 35:
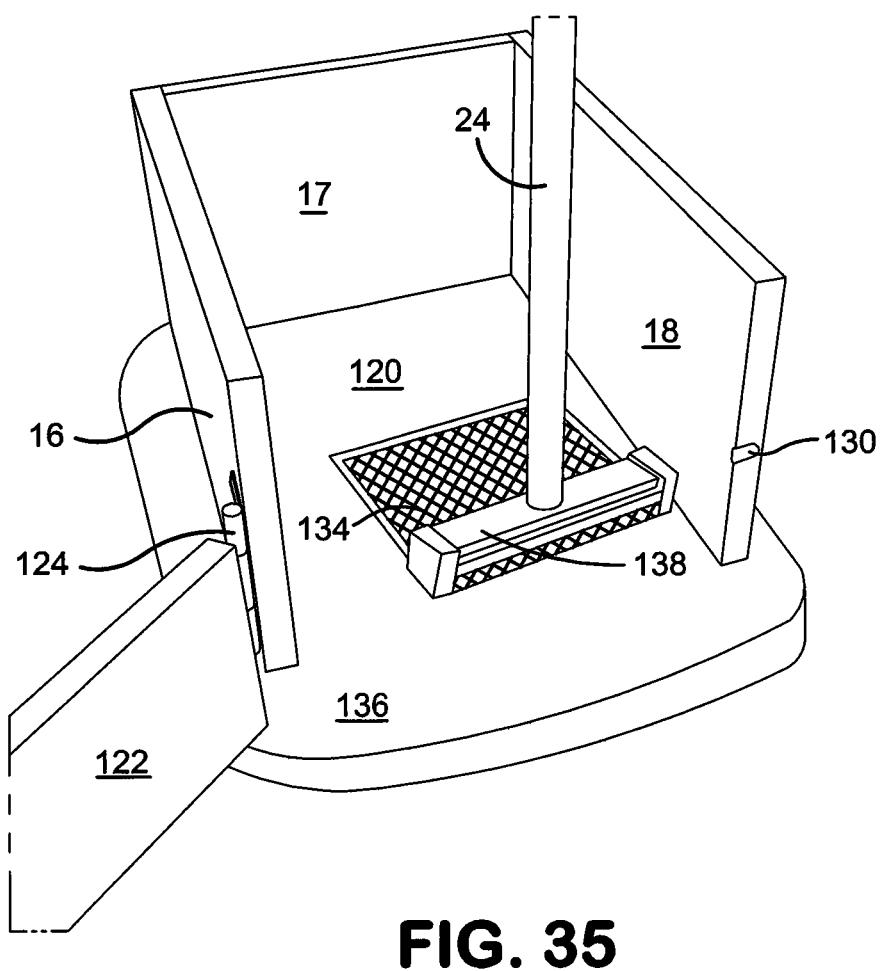
FIG. 35 is a front perspective view of the second embodiment of the base structure with the door in a full open position and showing the sieve member on the bottom wall of the base structure.
Figure 36:
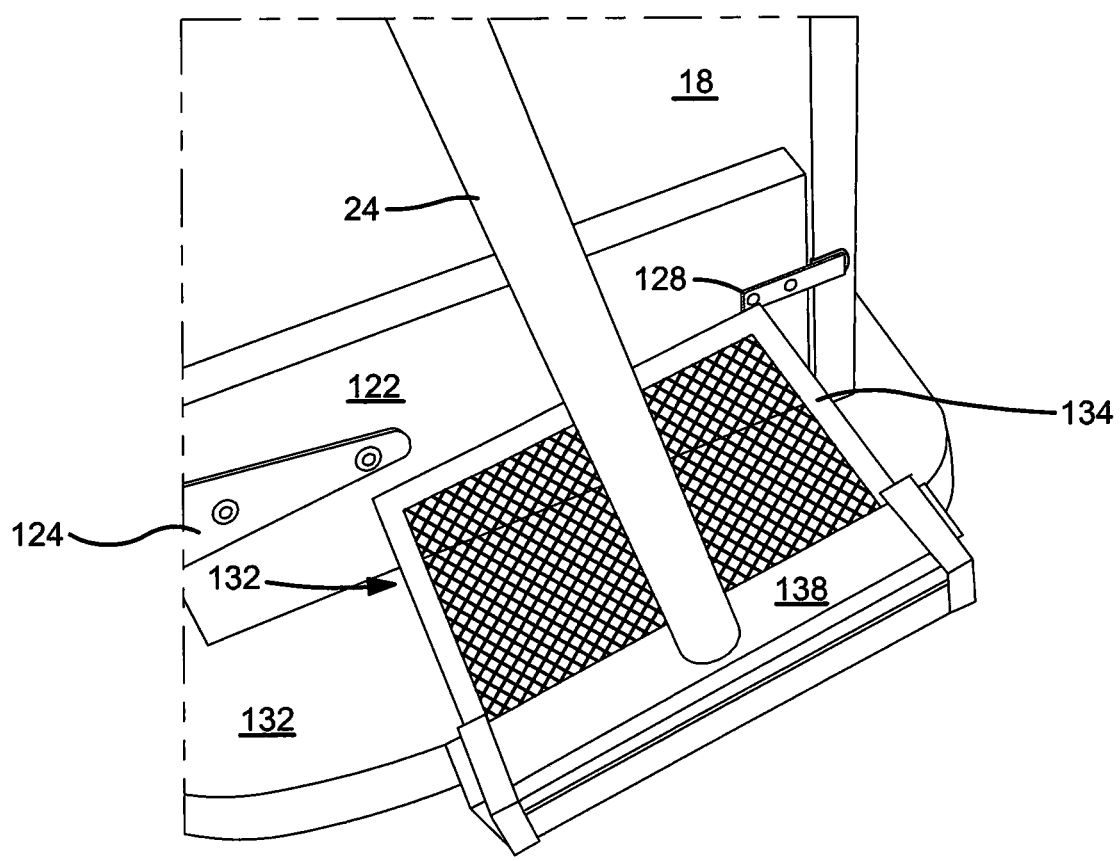
FIG. 36 is a partial front perspective view of the second embodiment of the base structure showing the sieve member in use to close the door of the base structure.
Figure 37:
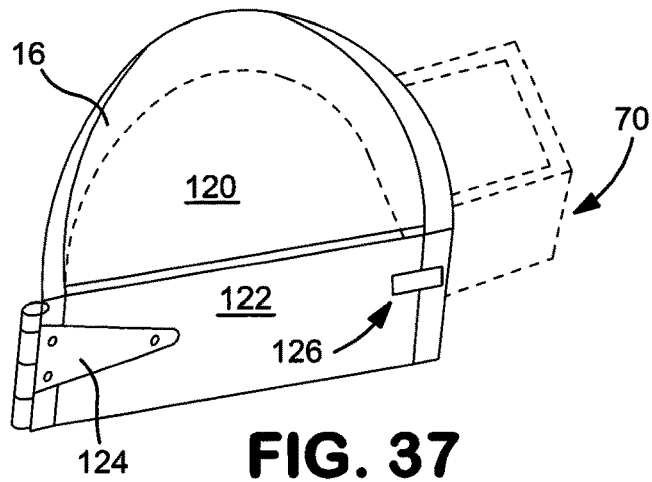
FIG. 37 is a front perspective view of the embodiment of FIG. 33 but having a one piece curved wall.

The closure mechanism 126 is constructed and arranged to provide opening and closing of the door by simple pressure on the back or front surface, respectively, of the door to engage or disengage the closure mechanism. A preferred embodiment of the closure mechanism is a magnetic closure system including a metal strip 128 and a magnet 130. FIG. 33 shows metal strip 128 attached to a front surface of door 122 in closed position overlaying magnet 130 present on adjoining upraised wall 18. As shown in FIG. 34, the sieve member 132 held by handle 24 is used to place pressure on the rear surface of door 122 to disengage the metal strip 128 from magnet 130 and swing the door on the hinge 124 to an open position as shown in FIG. 35. In this open position, access is fully provided to the interior of the base structure to allow use of the sieve member 132 to clean the litter using sifting portion 134. When cleaning is complete, the sieve member 132 is used to push the door back into a closed position as shown in FIG. 36. Accordingly, providing access does not require any bending, kneeling or significant physical exertion.

Figure 38:
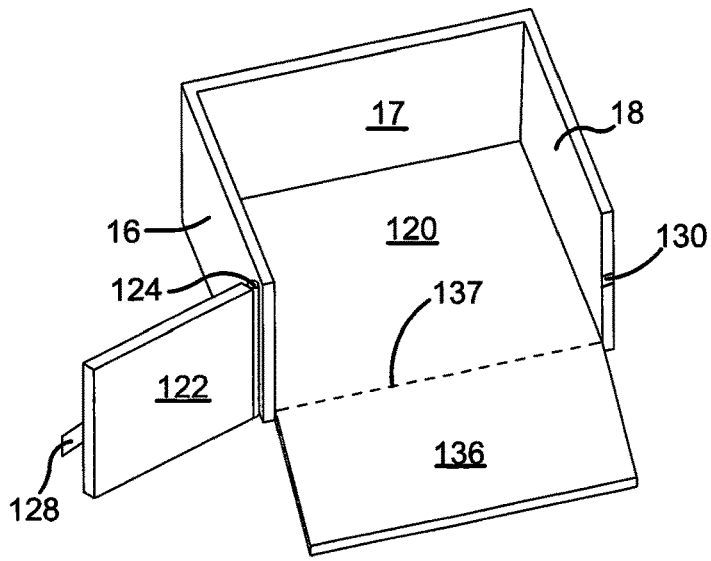
FIG. 38 is a front perspective view of the embodiment of FIG. 33 having a horizontal surface extending outward from the first bottom wall with a fold line therebetween.
Figure 39:
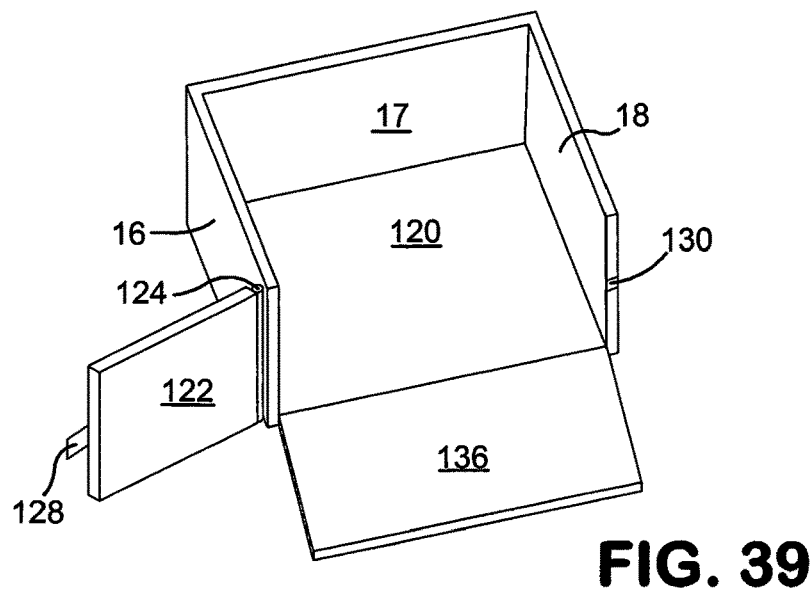
FIG. 39 is a front perspective view of the embodiment of FIG. 33 having a horizontal surface extending from the first bottom wall wherein the first bottom wall and the horizontal surface are separate adjoined pieces.

An extension area 136 is provided at least on the open side, including door 122, of the base structure. Any loose litter that may fall out when door 122 is opened will fall in this extension area 136 and can be readily swept back into the base structure using a broom or the like. Extension area 136 will also provide an area for the user to at least partially step on to maintain the base structure in place when using the sieve member to sift the litter to remove waste material. Extension area 136 can extend outward from the bottom wall 120 with a fold line 137 therebetween (see FIG. 38) or be a separate piece adjoined to bottom wall 120.

The sieve member of the second embodiment is similar to that of the first embodiment in that it includes at least a sifting portion 134 and a handle 24, and is able to stand upright so as to be stored and accessible without bending. The sieve member of the second embodiment, however, does not require a back wall portion due to the inclusion of the door in the base structure. Further, the sifting portion can be smaller in size since it does not have to be the same width as the open side of the base structure. The smaller size allows the sieve member to be lighter and more readily managed in relation to emptying waste on the sifting portion 134 into a trash receptacle. The structure of handle 24 can be as described above as to the first embodiment. Additionally, the sifting portion can include any of the other various options described in relation to the first embodiment, e.g., the configuration and sizing of the openings in the sifting portion, an inclined lip, a foot rest or pedal, etc. In addition to hand maneuvering of the sieve member, a foot can be used to insert the sieve member into the litter to provide sifting of the litter.

Use of the base structure and sieve member of the second embodiment to clean the litter held in the base structure of waste involves using the handle to pick up the sieve member and tap or push against the inside surface of door 122 as shown in FIG. 34 which disengages the metal strip 128 from magnet 130. The door will then swing out as shown in FIG. 35, to provide an open side to the base structure. The sieve member 132 is then inserted under the litter (not shown) and the sieve member lifted upward by handle 24 allowing the litter to fall out through sifting portion 134 while retaining waste on sifting portion 134. The sieve member becomes lighter as the litter falls back into the base structure. The sieve member can be pushed into the litter through the aid of the user's foot pushing on the back side of the sieve member, e.g., bar 138 as shown in FIGS. 33-36 or by a foot pedal, bend in handle 24, or the like as described above in relation to the first embodiment. After collecting the waste on top of sifting portion 134, the user maneuvers the sieve member over a trash receptacle to empty the waste from the sifting portion into the trash receptacle. This can be done by simply tipping the sieve member by turning handle 24. When not in use, the sieve member is free standing and may simply be stood next to the base structure. Alternatively, the base structure may include a clip or other fastening element attached to a surface of an upraised wall thereto to receive the handle of the sieve member to maintain the sieve member in place, and if desired, raised above the floor.

A further feature, which adds to the ease of use of the pet litter box, is the provision of a trash receptacle extending from an upraised wall of the base structure. The base structure can be that of either the first embodiment or the second embodiment of the pet litter box. The adjacent location of the trash receptacle further simplifies the cleaning process since disposal of the waste collected by the sieve member does not require walking to another location or carrying a trash receptacle to the base structure. The immediate adjacent position also prevents the spillage of any minute waste or litter particles through the sifting portion of the sieve member or accidental spillage. The motions required for cleaning the litter box are minimalized.

Figure 21:
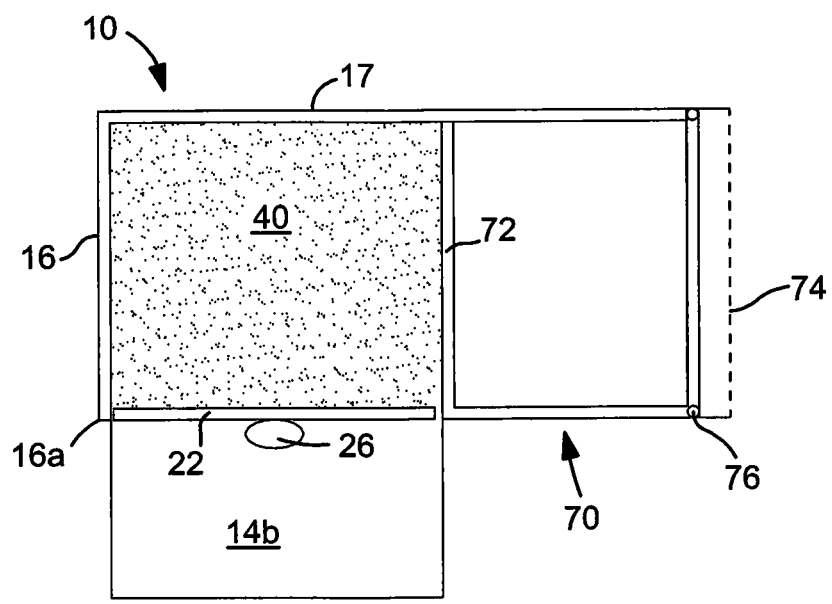
FIG. 21 is a top plan view of the embodiment of FIG. 20 wherein the base structure and the trash receptacle have a common upraised wall.
Figure 27:
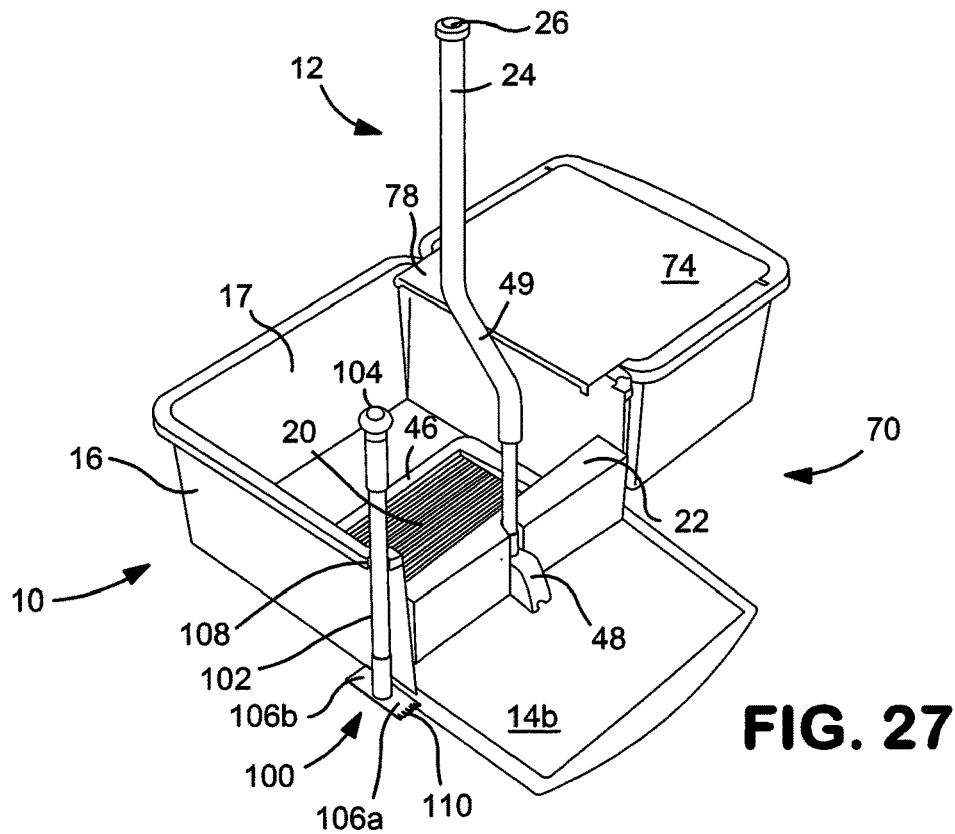
FIG. 27 is a perspective of the pet litter box system including the base structure, sieve member, closed trash receptacle, and a cleaning implement held by a C-shaped holder which is an integral part of a side wall of the base structure.

The trash receptacle can be provided with the base structure as an integral one-piece structure or as a separate add-on structure. Further, the trash receptacle may be present on either side of the structure so as to better accommodate left or right handed users, or accommodate different positioning of the system in a home. For ease of discussion, the combined pet litter box and trash receptacle will be described and shown in relation to the structure of the first embodiment. This trash receptacle, however, is also possible for use in the same manner with the base structure of the second embodiment. One embodiment of the one-piece structure is shown in FIGS. 20 and 21 wherein the trash receptacle 70 and base structure 10 have a common upraised wall 72. In FIGS. 20, 21 and 27, the trash receptacle 70 is illustrated as being of same or similar width and height as the base structure 10. It is to be understood that the dimensions of the trash receptacle can be varied. A beneficial feature of the trash receptacle is that the receptacle has a top opening which is maintained or maintainable in an open position to allow depositing of waste from the sieve member without the need of using a hand to touch or hold the trash receptacle during disposal.

The trash receptacle preferably has a lid 74 to conceal disposed waste from view and control odor from the waste. The lid 74 includes a hinge or pivot mechanism which allows the lid to move between a closed and open position as shown in FIGS. 20, 27 and 29. The lid in a closed position (shown in dotted lines in FIG. 20 and solid lines in FIGS. 27 and 28) has a lip 78 which extends beyond wall 72 so that the sieve member 12 can push against the underside of the extended lip to open the lid 74. The upward motion then allows the sieve member to easily move over the open top of the trash receptacle and the sideways emptying of the waste collected by the sieve member into the receptacle. FIG. 20 illustrates this action. For ease of understanding, as illustrated in FIG. 20, the sieve member 12 is rotated to show the collected waste on the screen portion 20 and being emptied therefrom into trash receptacle 70. In use, the back wall 22 would be seen from the front view since the sole action necessary to clean the base structure and dispose of the waste is to lift the sieve member 12 upward to collect the waste 56 on the sifting portion 20, and in the same lifting motion catch the underside of the extended lip 78 to raise lid 74 to open the trash receptacle and allow dumping of the waste 56 into the receptacle. The lid 74 in an open position preferably opens to an obtuse angle to act as a deflector to any debris during the emptying process and to be retained at an easily reachable position for closing. The empty sieve member is then used to close the lid and is placed back in the base structure for further use. No rotation of the sieve member is necessary in use. The trash receptacle should preferably have a removable liner therein to allow for easy and sanitary emptying of the trash receptacle on a desired basis. The liner can be a reusable plastic or metal liner, or can be a disposable liner, e.g., a plastic bag. The liner can be held in place by conventional means, for example, in the case of a plastic bag by a U-shaped clip holding the bag against the top edges of the receptacle (not shown).

Figure 22:
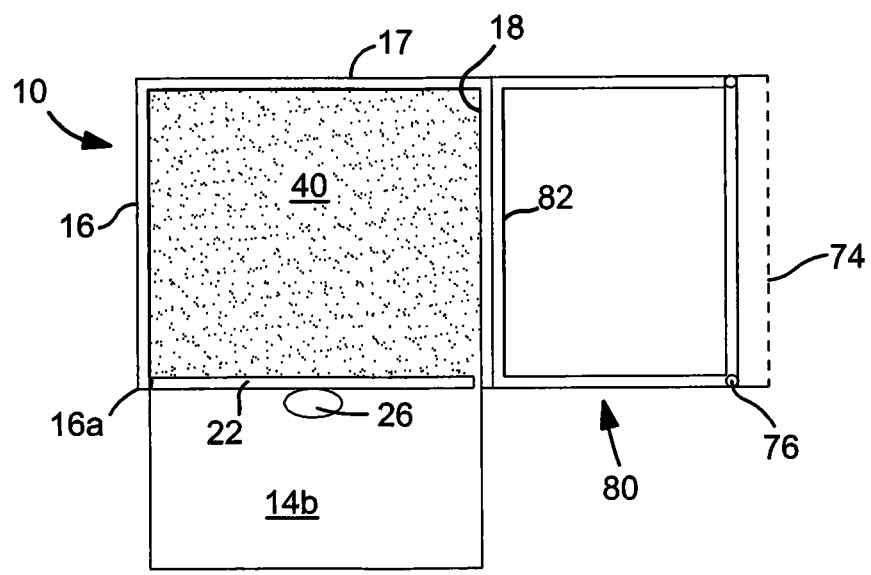
FIG. 22 is a top plan view of another embodiment of the base structure having a trash receptacle extending from one upraised wall of the base structure wherein each of the base structure and the trash receptacle have independent upraised walls wherein two adjacent walls are affixed together.
Figure 26:
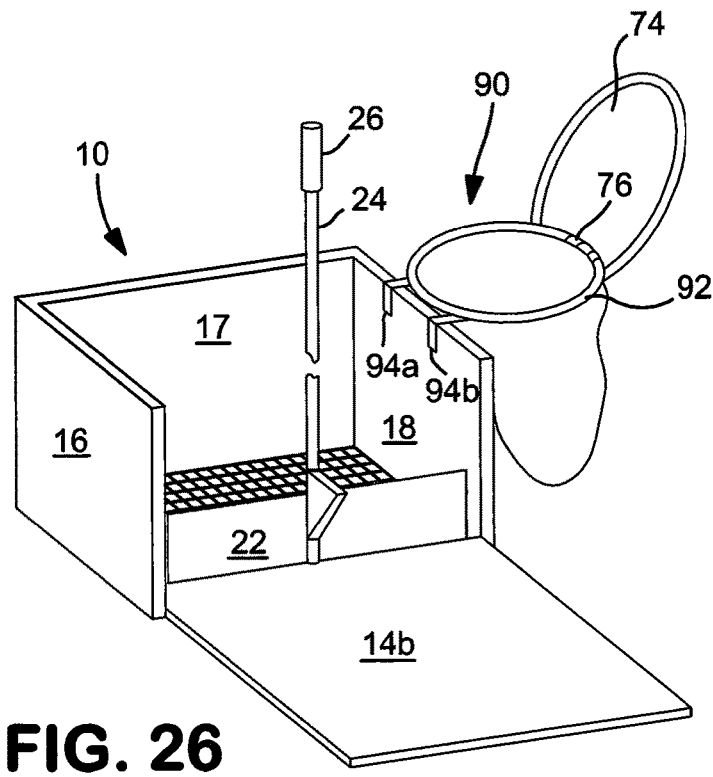
FIG. 26 is a side perspective view of an alternative embodiment of the base structure and an adjoining trash receptacle, wherein the trash receptacle includes a rigid frame and a downward extending bag.

The trash receptacle in another embodiment can be a separate member 80 from the base structure 10 as shown in FIGS. 22, 26 and 29.

Figure 23:
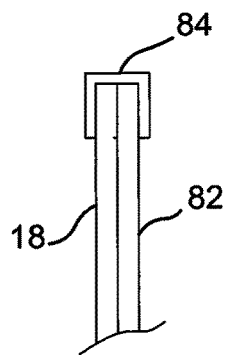
FIG. 23 illustrates a side view of a U-shaped clip which is one embodiment of an adjoining member for affixing a wall of a base structure to a wall of the trash receptacle.
Figure 24:
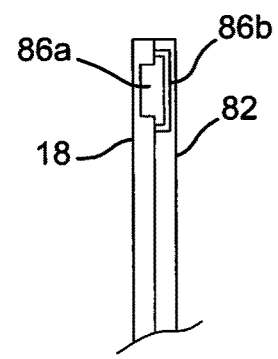
FIG. 24 illustrates a cut-away side view of mating snap members as another embodiment of an adjoining member for affixing a wall of the base structure to a wall of the trash receptacle.
Figure 25:
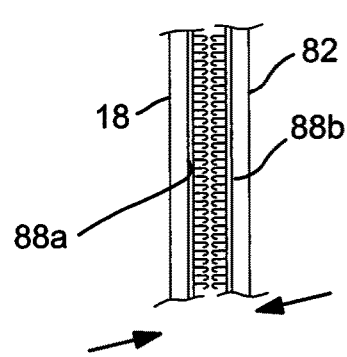
FIG. 25 illustrates a cut-away side view of mating Velcro strips (mating hooks and loops structure) as another embodiment of an adjoining member for affixing a wall of the base structure to a wall of the trash receptacle.

In FIGS. 22 and 29, one wall 82 of separate trash receptacle 80 abuts wall 18 of the base structure 10. The walls are held in this abutting position through the use of appropriate joining members, for example, a U-shaped clip 84 (FIG. 23), mating snap elements 86a and 86b (FIG. 24), mating hook and loop strips (Velcro strips) 88a and 88b (FIG. 25), overhanging lip 21 (FIG. 29), or the like. A lid of the same type as shown in FIG. 20 can be used with the separate trash receptacle 80. When the trash receptacle is a separate member from the base structure, the trash receptacle preferably also includes a bail 85 (as shown in FIG. 29) to assist in carrying the trash receptacle if it is to be moved for some reason.

FIG. 26 shows a separate trash receptacle 90 being provided with a rigid frame 92 attached to an upraised wall (e.g., wall 18) of the base structure 10 by appropriate joining means, e.g., hangers 94a and 94b as shown in FIG. 26, or other appropriate means, e.g., snap members, Velcro and the like. The frame 92 can have a lid 74 hingedly or pivotally connected thereto. The frame will have attached thereto a bag for collecting the waste. The bag with collected waste may be removed and disposed of. The bag may be attached to the frame 92 by clips, re-sealable tape, or other joining means (not shown) or threaded onto the frame 92. The lid can be of the same type as in the embodiment of FIG. 20 or different if desired.

Figure 28:
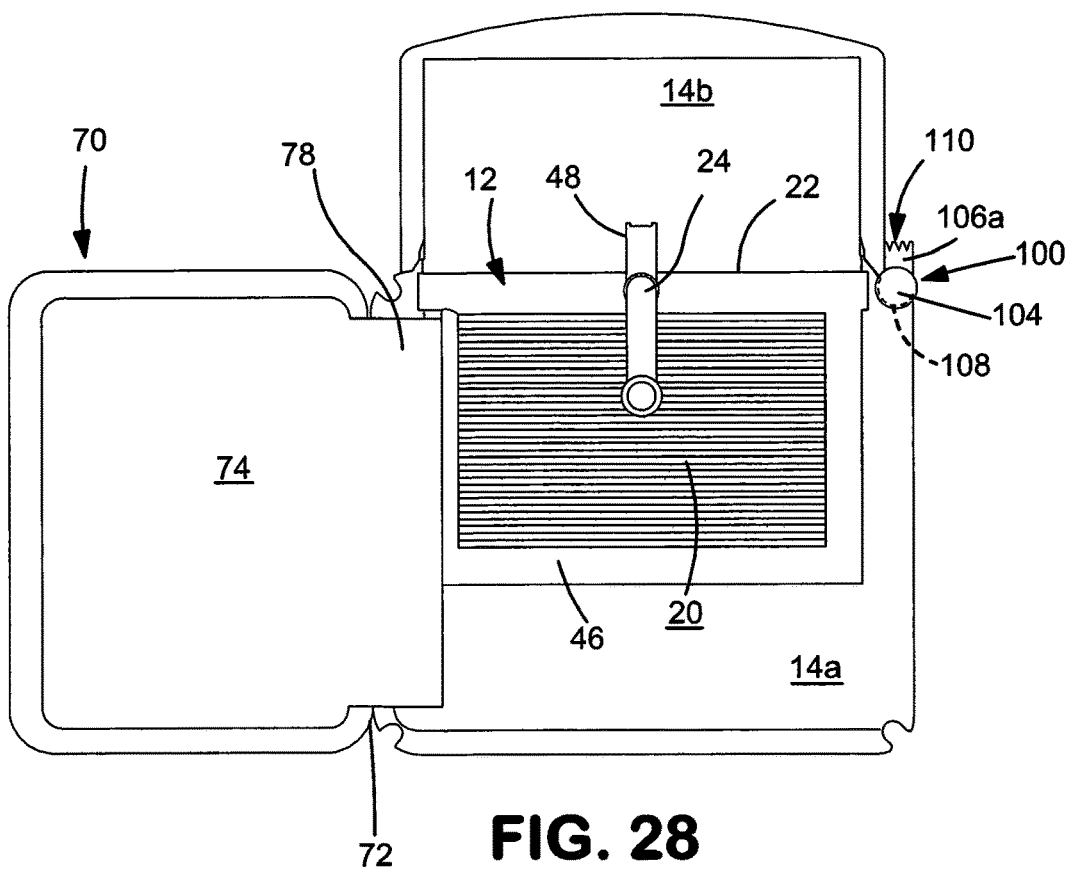
FIG. 28 is a top plan view of FIG. 27.
Figure 29:
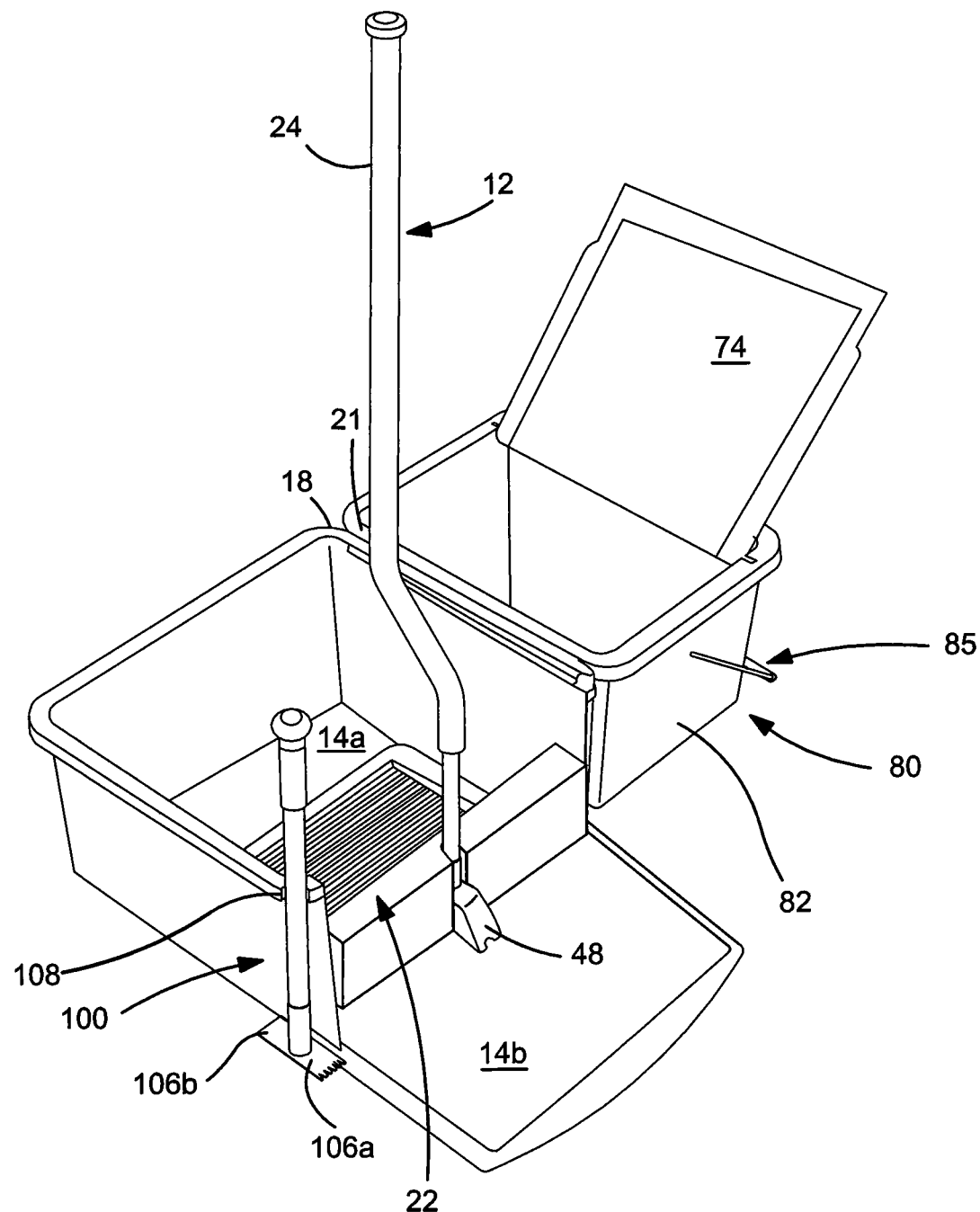
FIG. 29 is a perspective view of the pet litter box system as in FIG. 27 except the lid is in an open position.

The pet litter box and cleaning system is shown in FIGS. 27, 28 and 29 as including the base structure 10, sieve member 12, trash receptacle 70, and a cleaning implement 100. The cleaning implement includes a handle 102, with a grip portion, and a scraper head 106. The handle 102 can be made to be adjustable in length such as described above with respect to the handle portion 24 of the sieve member 12. During non-use, the cleaning implement can be hung in a C-shaped member 108, or other retaining member as made part of or as attached to a wall of the base structure or trash receptacle so as to extend from the wall. In use, the cleaning implement is held by the handle and used to clean any waste material from the sifting portion of the sieve member or used to move waste material present in the base structure onto or better onto the sifting portion. The handle has an extended length and the scraper head extends from the end of the handle at an angle which does not require the user to bend over during use of the cleaning implement. The scraper head 106 is, thus, present at an angle to the handle 102 of equal to or greater than 90° to less than 180°. See FIGS. 27, 30 and 31.

Figure 32:
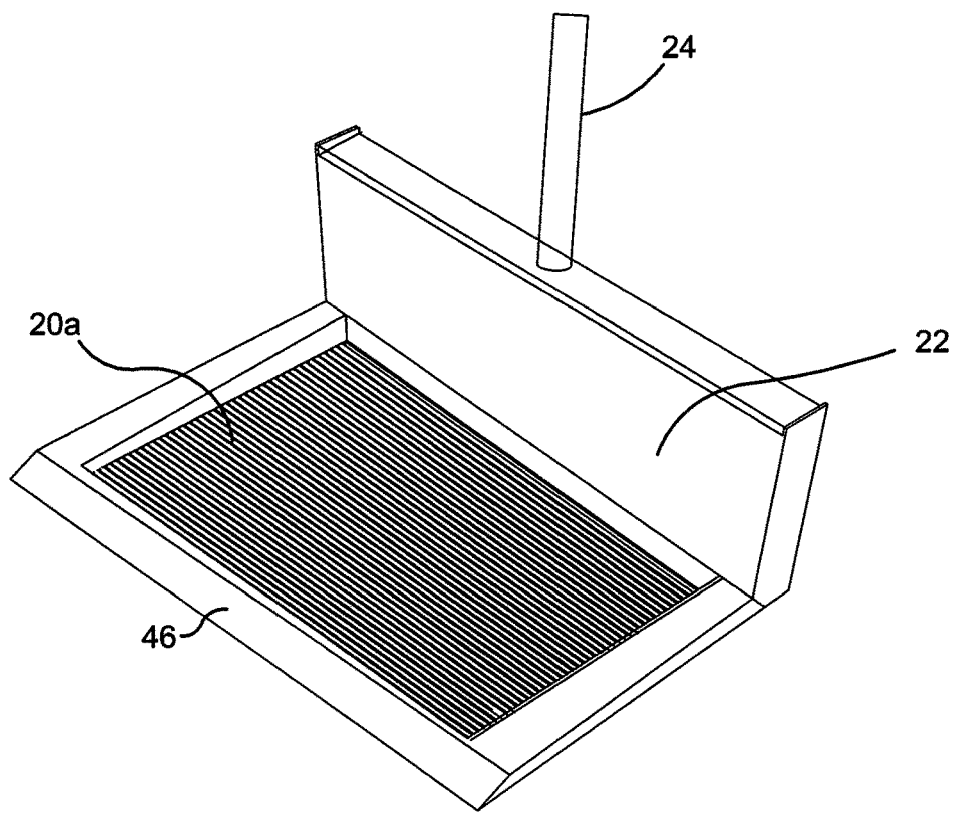
FIG. 32 is a perspective view of a further embodiment of the sifting portion and back wall of the sieve member.
Figure 32A:
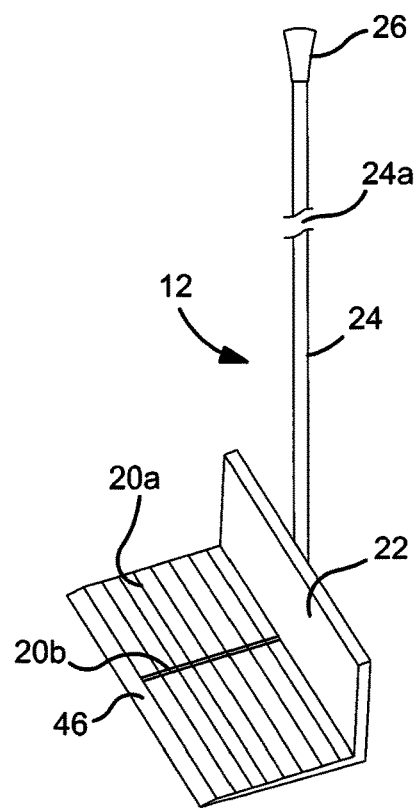
FIG. 32a is a perspective view of a further embodiment of the sifting portion of the sieve member.

The cleaning implement can be of various structures. A preferred structure is shown in FIGS. 30 and 31. Such cleaning implement includes a handle 102 with a grip portion 104 and a scraper head 106. The scraper head 106 preferably includes a plurality of teeth or tines 110 so as to provide points which can extend into the openings in the sifting portion. The angle of the scraper head 106 to the handle 102 is illustrated in FIG. 31. To increase efficiency in use, the crossbars of the sifting portion preferably extend widthwise, as illustrated in FIGS. 32 and 32a and denoted as 20a, to allow for insertion of the teeth 110 between the crossbars over the entire movement thereacross by the scraper head 106. One (or more) lengthwise crossbar(s) 20b may be present to provide rigidity to the widthwise crossbars 20*a* depending on the strength or rigidity of the widthwise crossbars.

An alternative embodiment of the cleaning implement is shown in FIG. 27 and includes a handle 102 with a grip portion 104 and scraper head 106. In this embodiment, the scraper head includes a front portion 106*a* and a back portion 106*b*. Front portion 106*a* includes a plurality of teeth 110. Back portion 106*b* has a straight edge for moving waste in the base structure 10 onto the sifting portion of sieve member 12 or for scraping the top surface of the sifting portion to remove any debris adhered thereto.

Exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. A pet litter box comprising, in combination:
   (a) a base structure comprising
      (i) a first bottom wall having a first perimeter defining an interior area of the first bottom wall,
      (ii) at least one side wall which adjoins and extends upward from a substantial portion of the first perimeter of the first bottom wall so as to leave a portion of the first perimeter free of said at least one side wall, and
      (iii) a door structured and arranged to releasably close said portion of the first perimeter free of said at least one side wall, and the door has a height sufficient to substantially retain litter within the first perimeter of the first bottom wall when the door is in a closed position;
   (b) a sieve member comprising
      (i) a horizontally planar sifting portion, wherein the sifting portion has a second perimeter smaller than said first perimeter of the first bottom wall and has a configuration which allows insertion of the sifting portion through the portion of the first perimeter free of said at least one wall, and
      (ii) a handle member extending from said sifting portion.

2. The litter box of claim 1 wherein said base structure further comprises a horizontal surface defining an exterior area extending outward from said portion of the first perimeter free of said at least one wall and beyond said door.

3. The litter box of claim 1 wherein said door at one end is hingedly connected to said at least one side wall.

4. The litter box of claim 1 wherein said door is held in a releasably closed position by a magnetic fastening system.

5. The litter box of claim 1 wherein said at least one wall is a one piece curved wall.

6. The litter box of claim 1, wherein said at least one wall is a plurality of abutting flat walls.

7. The litter box of claim 2, wherein said first bottom wall and said horizontal surface are one piece.

8. The litter box of claim 7, wherein a fold line is present between said first bottom wall and said horizontal surface.

9. The litter box of claim 2, wherein said first bottom wall and said horizontal surface are separate adjoined pieces.

10. The litter box of claim 1, wherein said handle member has a telescoping structure and is adjustable in height.

11. The litter box of claim 1, wherein said sieve member has an inclined lip surface along a leading edge of the sifting portion.

12. The litter box of claim 1 wherein said handle member includes a foot rest as a part thereof or connected thereto.

13. The litter box of claim 1 wherein said handle member includes a body portion, wherein said body portion includes an angled section or a curved section.

14. A pet litter box cleaning system comprising, in combination:
   (a) a base structure comprising a bottom wall including an interior area, one or more upraised walls along a perimeter of said interior area while leaving a portion of the perimeter free of the one or more upraised walls;
   (b) a door structured and arranged to releasably close the portion of the perimeter free of said one or more upraised walls, and of a height sufficient to substantially retain litter within the perimeter of said interior area when the door is in a closed position;
   (c) a sieve member comprising a horizontally planar sifting portion configured to fit in said interior area of said base structure through said portion of the perimeter free of the one or more upraised walls, and a handle extending upward from said sifting portion; and
   (d) a trash receptacle extending outward from one of said one or more upraised walls of said base structure.

15. The litter box of claim 14 wherein said bottom wall of said base structure further comprises an exterior area wherein the exterior area extends outward from said portion of the perimeter which is free of the one or more upraised walls.

16. The litter box of claim 14 wherein said door is hingedly connected to said one or more upraised walls.

17. The litter box of claim 14 wherein said door is held in the closed position by a magnetic fastening system.

18. The litter box of claim 14 wherein said at least one or more upraised walls and said door are plastic.

19. The system of claim 14 wherein said at least one or more upraised walls is a one piece wall.

20. The system of claim 14 wherein said at least one or more upraised walls is a plurality of abutting walls.

21. The system of claim 15 wherein the exterior area of said bottom wall is one piece with the interior area of the bottom wall.

22. The system of claim 14 wherein said handle has a telescoping structure and is adjustable in height.

23. The system of claim 14 wherein said trash receptacle and said base structure have a common upraised wall.

24. The system of claim 14 wherein said trash receptacle has a lid with an extended lip.

25. The system of claim 14 wherein said trash receptacle is separate and abuts said base structure and is held to said base structure by at least one joining member.

* * * * *